United States Patent [19]

Wariishi

[11] Patent Number: 6,020,105

[45] Date of Patent: Feb. 1, 2000

[54] INFORMATION RECORDING MEDIUM

[75] Inventor: Koji Wariishi, Kanagawa, Japan

[73] Assignee: Fuji Photo Film Co., Ltd., Kanagawa, Japan

[21] Appl. No.: 08/947,197

[22] Filed: Oct. 8, 1997

[30] Foreign Application Priority Data

Oct. 8, 1996 [JP] Japan .................................. 8-267598

[51] Int. Cl.$^7$ ............................... G11B 7/24; B41M 5/26
[52] U.S. Cl. .................................. 430/270.2; 430/270.19; 430/945; 430/270.21; 430/275.1
[58] Field of Search .................. 430/270.19, 270.16, 430/270.2, 270.21, 945, 275.1

[56] References Cited

U.S. PATENT DOCUMENTS

| 4,656,121 | 4/1987 | Sato et al. ............................ 430/945 |
| 5,108,873 | 4/1992 | Fukui et al. ........................ 430/270.19 |
| 5,182,186 | 1/1993 | Inagaki et al. ..................... 430/270.19 |
| 5,294,471 | 3/1994 | Evans et al. ............................ 430/945 |
| 5,332,608 | 7/1994 | Tsuji et al. ........................ 430/270.19 |
| 5,789,138 | 8/1998 | Yashiro ............................. 430/270.16 |

FOREIGN PATENT DOCUMENTS 59-016785  1/1984  Japan .

*Primary Examiner*—Martin Angebranndt
*Attorney, Agent, or Firm*—Sughrue, Mion, Zinn, Macpeak & Seas, PLLC

[57] ABSTRACT

An information recording medium having a high light-resistance has a recording layer containing an organic dye and a quaternary ammonium salt having the following formula (I):

$$M^{n+} \cdot n/m \ X^{m-} \quad (I)$$

in which $M^{n+}$ represents a quaternary ammonium ion, $X^{m-}$ represents an anion, n represents an integer of 2 or more, and m represents an integer of 1 or more.

7 Claims, No Drawings

INFORMATION RECORDING MEDIUM

FIELD OF THE INVENTION

This invention relates to a method for preventing an organic dye from fading, and an information recording medium on which information can be recorded by means of a laser beam having a high energy density.

BACKGROUND OF THE INVENTION

An information recording medium on which information can be recorded by means of a laser beam is known as a recordable compact disc (CD-R), and is widely used, for instance, as a large capacity computer data disc.

The optical disc of CD-R type generally comprises a disc-shaped substrate (support) made of polymer and a recording layer provided thereon on which information can be recorded by means of a laser beam. The recording layer comprises a metal such as In or Te, or alternatively a dye such as a cyanine dye.

The recording layer comprising dye can be easily formed by a coating method and shows a high sensitivity, as compared with the recording metal layer. The such recording dye layer is very advantageous in view of production costs, but the dye layer has such disadvantages as low light-resistance and low heat resistance. Therefore, it has been desired to develop a recording dye layer having high durability against light and heat, as well as high recording and reproducing characteristics.

In order to improve the light-resistance of recording dye layer, various compounds known as singlet oxygen quenchers are generally added to the recording dye layer. For example, a transition metal chelate complex is contained as singlet oxygen quencher with a cyanine dye in the recording layer of the information recording medium disclosed in Japanese Patent Publication No. H1-38680 and Japanese Patent Provisional Publication No. H4-146189. In Japanese Patent Provisional Publication No. H2-300288, a nitroso compound is used as a singlet oxygen quencher for a cyanine dye. Further, Japanese Patent Provisional Publication No. 63-209995 describes an optical disc having a recording layer which contains an oxonol dye and a transition metal complex of singlet oxygen quencher. According to the publication, such optical disc shows stable recording and reproducing characteristics for a long period of time.

However, most of the above transition metal complexes are environmentally unfavorable compounds. Further, when the nitroso compound is used as the singlet oxygen quencher, a considerable amount of the compound must be added so as to sufficiently enhance the light-resistance, but the increased amount of the compound often lowers the light-reflection of the optical disc. Since an optical disc is required to have a high light-reflection, the incorporation of the increased amount of the nitroso compounds is not advantageous.

U.S. Pat. No. 4,656,121 discloses an optical disc having a recording layer which comprises a diimmonium compound and a dye such as a cyanine dye or a merocyanine dye. However, since the diimmonium compound also absorbs the light of laser, the reflection of the laser beam is apt to lower in the case that an increased amount of the diimmonium compound is used.

Accordingly, it is an object of the present invention to provide a method for preventing an organic dye from fading, so that the light-resistance of the recording dye layer can be improved.

It is another object of the invention to provide an information recording medium having recording characteristics and particularly high light-resistance to show satisfying recording characteristics for a long period.

SUMMARY OF THE INVENTION

The present invention resides in an information recording medium comprising a support and a recording layer provided thereon; wherein said recording layer comprises an organic dye and a quaternary ammonium salt having the following formula (I):

$$M^{n+} \cdot n/m \, X^{m-} \quad (I)$$

in which $M^{n+}$ represents a quaternary ammonium ion, $X^{m-}$ represents an anion, n represents an integer of not less than 2, and m represents an integer of not less than 1.

The invention further resides in a method for preventing an organic dye from fading which comprises mixing the organic dye with the quaternary ammonium salt having the above-mentioned following formula (I).

In the information recording medium of the invention, the quaternary ammonium ion represented by $M^{n+}$ preferably is a divalent ion of a nitrogen-atom containing heterocyclic compound, for instance, a divalent ion of a nitrogen-atom containing heterocyclic compound which contains two nitrogen atoms as its ring member and which has a substituent group on each of the nitrogen atoms.

More preferably, the quaternary ammonium ion represented by $M^{n+}$ is a divalent ion of a 2,2'-bipyridyl compound, a 4,4'-bipyridyl compound, or a phenanthroline compound, for instance, a divalent ion of 2,2'-bipyridyl, 4,4'-bipyridyl or phenanthroline which has on each of its nitrogen atoms a substituent group such as an alkyl group, an alkenyl group, an alkynyl group, or an aryl group.

More specifically, it is preferred that the quaternary ammonium ion represented by $M^{n+}$ has the following formula (II) or (III):

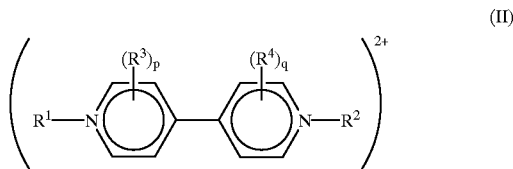

(II)

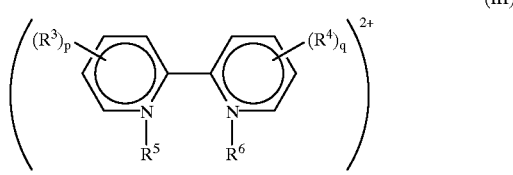

(III)

in which each of $R^1$ and $R^2$ independently represents an alkyl group, an alkenyl group, an alkynyl group, or an aryl group; each of $R^3$ and $R^4$ independently represents a substituent group or substituent atom; each of $R^5$ and $R^6$ independently represents an alkyl group, an alkenyl group, an alkynyl group, or an aryl group; or each set of $R^1$ and $R^2$, $R^3$ and $R^4$, or $R^5$ and $R^6$ can be combined to form a ring; each of p and q independently represents an integer of 0 to 4, under the conditions that there can be different $R^3$ in the case that p is 2 or more, and there can be different $R^4$ in the case that q is 2 or more.

The anion represented by $X^{m-}$ is preferably selected from the group consisting of $Cl^-$, $Br^-$, $I^-$, p-toluenesulfonate anion, $ClO_4^-$, $BF_4^-$, and $SbF_6^-$.

DETAILED DESCRIPTION OF THE INVENTION

The information recording medium of the invention can be prepared by the following method.

The substrate (support) which is transparent can be made of any of materials known as the materials for the producing the substrate of the light information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. These materials are molded to give a film or a rigid plate. Most preferred from the viewpoints of anti-humidity and dimensional stability is polycarbonate.

The substrate may have on its surface on the recording layer side an undercoating layer for enhancing surface smoothness and adhesion, and keeping the dye recording layer from deterioration. Examples of the material for the undercoating layer include polymers such as polymethyl methacrylate, acrylate-methacrylate copolymer, styrene-maleic anhydride copolymer, polyvinyl alcohol, N-methylolacrylamide, styrene-vinyltoluene copolymer, chloro-sulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by coating a solution in which one or more of the above-mentioned materials are dissolved or dispersed on the surface of the substrate by the known coating methods such as spin-coat, dip-coat, and extrusion-coat. The undercoating layer generally has a thickness of 0.005 to 20 $\mu$m, preferably 0.01 to 10 $\mu$m.

On the surface of the substrate or on the undercoating layer, groove for tracking or giving address signals is preferably formed. The groove is preferably formed directly on the surface of the substrate when the substrate is molded from polymer material by injection or extrusion.

Alternatively, the groove can be provided on the surface of the substrate by placing a pregroove layer. The pregroove layer can be produced from a mixture of a monomer such as monoester, diester, triester, or tetraester of acrylic acid, or its oligomer, and a light-polymerization reaction initiator. The pregroove layer can be produced by the steps of coating a mixture of the polymerization initiator and the monomer such as the above-mentioned acrylic ester on a precisely produced stamper, placing on the coated layer a substrate, and irradiating the coated layer with ultra-violet rays through the stamper or substrate, so as to cure the coated layer as well as to combine the cured layer and the substrate. The substrate to which the cured coated layer is attached is separated from the stamper, to give the desired substrate equipped with the pregroove layer. The thickness of the pregroove layer generally is in the range of 0.05 to 100 $\mu$m, preferably in the range of 0.1 to 50 $\mu$m.

The pregroove formed on the substrate preferably has a depth in the range of 300 to 2,000 angstroms and a half-width of 0.2 to 0.9 $\mu$m. The depth of 1,500 to 2,000 angstroms of the pregroove is preferably adopted because such pregroove can enhance the sensitivity without decreasing the light-reflection on the substrate. The optical disc having a recording layer coated on the deep pregoove and a light-reflection layer shows a high sensitivity, and hence is employable even in a recording system using a laser light of low laser power. This means that a semiconductor laser of a low output power can be employed, and the life of semiconductor laser can be prolonged.

On the substrate, the recording dye layer comprising a dye and a quaternary ammonium salt of the formula (I) is placed.

The light-resistance of the recording dye layer can be improved by employing the quaternary ammonium salt with an organic dye. The quaternary ammonium salt and the organic dye may be mixed in the form of solution in which both of the salt and the dye are dissolved. The solution can be coated on the substrate, and dried to form a coated layer. The light-resistance of the dye can be enhanced both in the mixed solution and in the dried coated layer.

A quaternary ammonium salt can be generally obtained by alkylation, alkenylation, alkynylation or arylation of a tertiary amine (e.g., N,N,N',N'-tetramethylethylenediamine and triethylenediamine) or a nitrogen-containing heterocyclic ring (e. g., pyridine, picoline, 2,2'-bipyridyl, 4,4'-bipyridyl, 1,10-phenanthroline, quinoline, oxazole, thiazole, N-methylimidazole, pyrazine, and tetrazole).

The quaternary ammonium ion represented by $M^{n+}$ in the formula (I) is preferably not a cyanine dye but a quaternary ammonium ion comprising a nitrogen-containing heterocyclic ring, and more preferably a quaternary pyridinium ion. "n" in the formula (I) is an integer of not less than 2, preferably 2 to 10, more preferably 2 to 5. Most preferably n is 2.

The anion represented by $X^{m-}$ in the formula (I) can be an inorganic anion or an organic anion. Examples of the anion include halide ions (e.g., Cl$^-$, Br$^-$, and I$^-$), sulfonato ions (e.g., $CH_3SO_3^-$, $CF_3SO_3^-$, $CF_3(CF_2)_7SO_3^-$, p-toluenesulfonato ion, and naphthalene-1,5-disulfonato ion), sulfate ions (e.g., $CH_3SO_4^-$), $ClO_4^-$, $BF_4^-$, $SbF_6^-$ and phosphate ions such as $PF_6^-$ and the following phosphonate ion:

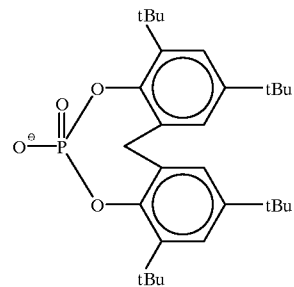

Also employable are metal complex ions, for instance, those having the following formula:

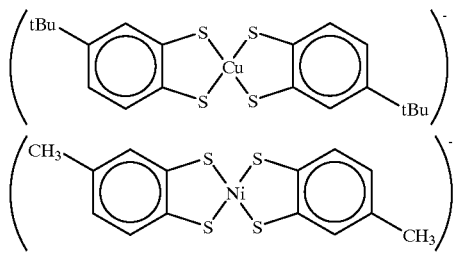

-continued

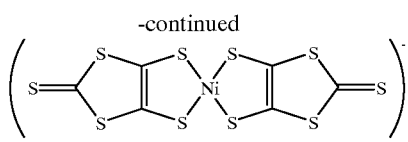

Among these ions, preferred are Cl⁻, Br⁻, I⁻, p-toluenesulfonato ion, $ClO_4^-$, $BF_4^-$, and $SbF_6^-$.

As described hereinbefore, the quaternary ammonium ion preferably has the aforesaid formula (II) or (III).

In the formula (II) or (III), the alkyl groups preferably employable for $R^1$, $R^2$, $R^5$ or $R^6$ is an alkyl group of 1–18 (more preferably 1–8) carbon atoms which may have one or more substituent groups and which may be in the form of straight-chain or branched-chain, or cyclic structure. Examples of the alkyl groups include methyl, ethyl, propyl, isopropyl, n-butyl, isobutyl, n-hexyl, cyclohexyl, and cyclopropyl. Examples of the substituent groups include a halogen atom (e.g., F, Cl, and Br); an alkoxy group of 1–18 (preferably 1–8) carbon atoms (e.g., methoxy and ethoxy); an aryloxy group of 6–10 carbon atoms (e.g., phenoxy, and p-methoxyphenoxy); an alkylthio group of 1–18 (preferably 1–8) carbon atoms (e.g., methylthio and ethylthio); an arylthio group of 6–10 carbon atoms (e.g., phenylthio); an acyl group of 2–18 (preferably 2–8) carbon atoms (e.g., acetyl and propionyl); an acyloxy group of 2–18 (preferably 2–8) carbon atoms (e.g., acetoxy and propionyloxy); an alkoxycarbonyl group of 2–18 (preferably 2–8) carbon atoms (e.g., methoxycarbonyl and ethoxycarbonyl); an alkenyl group of 2–18 (preferably 2–8) carbon atoms (e.g., vinyl); an alkynyl group of 2–18 (preferably 2–8) carbon atoms (e.g., ethynyl); an aryl group of 6–10 carbon atoms (e.g., phenyl and naphthyl); an aryloxycarbonyl group of 7–11 carbon atoms (e.g., naphthoxycarbonyl); an amino group having 0–18 (preferably 0–8) carbon atoms (e.g., unsubstituted amino, methylamino, dimethylamino, diethylamino, anilino, methoxyphenylamino, chlorophenylamino, morpholino, piperidino, pyrrolidino, pyridylamino, methoxycarbonylamino, n-butoxycarbonylamino, phenoxycarbonylamino, methylcarbamoylamino, phenylcarbamoylamino, acetylamino, ethylcarbonylamino, cyclohexylcarbonylamino, benzoylamino, chloroacetylamino, and methylsufamoylamino); a carbamoyl group of 1–18 (preferably 1–8) carbon atoms (e.g., unsubstituted carbamoyl, methylcarbamoyl, ethylcarbamoyl, n-butylcarbamoyl, t-butylcarbamoyl, dimethylcarbamoyl, morpholinocarbamoyl, and pyrrolidinocarbamoyl); a sulfamoyl group having 0–18 (preferably 0–8) carbon atoms (e.g., unsubstituted sulfamoyl, methylsulfamoyl, and phenylsulfamoyl); cyano group; nitro group; carboxyl group; hydroxyl group; and a heterocyclic group (e.g., groups derived from oxazole, benzoxazole, thiazole, benzothiazole, imidazole, benzoimidazole, indolenine, pyridine, sulfolane, furan, thiophene, pyrazol, pyrrole, chroman, and coumarin).

The alkenyl group preferably employable for $R^1$, $R^2$, $R^5$ or $R^6$ in the formula (II) or (III) is an alkenyl group of 2–18 (more preferably 2–8) carbon atoms which may have one or more substituent groups and which may be in the form of straight-chain or branched-chain or cyclic structure. Examples of the alkenyl groups include vinyl, allyl, isopropenyl, 1-propenyl, 1,3-butadienyl, and cyclohexenyl.

Examples of the substituent groups for the alkenyl groups are the same as those described hereinbefore for alkyl group except the alkenyl group.

The alkynyl group preferably employable for $R^1$, $R^2$, $R^5$ or $R^6$ is an alkynyl group of 2–18 (more preferably 2–8) carbon atoms which may have one or more substituent groups and which may be in the form of straight-chain or branched-chain or cyclic structure. Examples of the alkynyl group include ethynyl and 2-propynyl.

Examples of the substituent groups for the alkynyl groups are the same as those described hereinbefore for alkyl group except alkynyl group.

The aryl group preferably employable for $R^1$, $R^2$, $R^5$ or $R^6$ is an aryl group of 6–18 (more preferably 6–10) carbon atoms which may have one or more substituent groups. Examples of the aryl group include phenyl and naphthyl.

Examples of the substituent groups for the aryl groups are the same as those described hereinbefore for the alkyl group. The alkyl groups (e.g., methyl and ethyl) are also preferably used as the substituent groups.

$R^1$ and $R^2$ may be combined to form a ring. In such case, $R^1$ and $R^2$ are preferably connected by a bond between carbon atoms, or between a carbon atom and a hetero atom, or between hetero atoms present in $R^1$ and $R^2$. More preferably, $R^1$ and $R^2$ are connected by a bond between a carbon atom of $R^1$ and a carbon atom of $R^2$. It is particularly preferred that $R^1$ and $R^2$ be connected by a bond between a methylene group of $R^1$ and a methylene group of $R^2$.

$R^5$ and $R^6$ are preferably combined to form a ring. In such case, the ring preferably has 5 to 7 members, more preferably 6 members. The ring comprises $R^5$ and $R^6$ which are connected by a bond between carbon atoms, or between a carbon atom and a hetero atom, or between hetero atoms of $R^5$ and $R^6$. Preferably, $R^5$ and $R^6$ are connected by a bond between a carbon atom of $R^5$ and a carbon atom of $R^6$. It is particularly preferred that $R^5$ and $R^6$ be connected by a bond between a methylene groups of $R^5$ and $R^6$.

Examples of the substituent groups represented by $R^3$ or $R^4$ include; an alkyl group of 1–18 (more preferably 1–8) carbon atoms which may have one or more substituent groups and which may be in the form of straight-chain or branched-chain or cyclic structure (e.g., methyl, ethyl, propyl, isopropyl, n-butyl, isobutyl, sec-butyl, t-butyl, cyclohexyl, methoxyethyl, ethoxycarbonylethyl, cyanoethyl, diethyaminoethyl, hydroxyethyl, chloroethyl and acetoxyethyl); an aralkyl group of 7–18 (preferably 7–12) carbon atoms which may have one or more substituent groups (e.g., benzyl and carboxybenzyl); an alkenyl group of 2–18 (preferably 2–8) carbon atoms (e.g., vinyl); an alkynyl group of 2–18 (preferably 2–8) carbon atoms (e.g., ethynyl); an aryl group of 6–18 (preferably 6–10) carbon atoms which may have one ore more substituent groups (e.g., phenyl, 4-methylphenyl, 4-methoxyphenyl, 4-carboxyphenyl, and 3,5-dicarboxyphenyl); an acyl group of 2–18 (preferably 2–8) carbon atoms which may have one or more substituent groups (e.g., acetyl, propionyl, butanoyl, and chloroacetyl); a sulfonyl group of 1–18 (preferably 1–8) carbon atoms which may have one or more substituent groups (e.g., methanesulfonyl and p-toluenesulfonyl); an alkoxycarbonyl group of 2–18 (preferably 2–8) carbon atoms (e.g., methoxycarbonyl and ethoxycarbonyl); an aryloxycarbonyl group of 7–18 (preferably 7–12) carbon atoms (e.g., phenoxycarbonyl, 4-methylphenoxycarbonyl, and 4-methoxyphenylcarbonyl); an alkoxy group of 1–18 (preferably 1–8) carbon atoms which may have one or more substituent groups (e.g., methoxy, ethoxy, b-butoxy, and methoxyethoxy); an aryloxy group of 6–18 (preferably 6–10) carbon atoms which may have one or more substituent groups (e.g., phenoxy and 4-methoxyphenoxy); an acyloxy group of 2–18 (preferably 2–8) carbon atoms which may have one or more substituent groups (e.g., acetoxy, ethylcarbonyloxy, cyclohexylcarbonyloxy, benzoyloxy, and chloroacetyloxy); a sulfonyloxy group of 1–18 (preferably 1–8) carbon atoms which may have one ore more substituent groups (e.g., methanesulfonyloxy); a carbamoyloxy group of 2–18 (preferably 2–8) carbon atoms (e.g., methylcarbamoyloxy and diethylcarbamoyloxy); an amino group having 0–18 (preferably 0–8) carbon atoms which may have one or more substituent groups (e.g., unsubstituted amino, methylamino, dimethylamino, diethylamino, anilino, methoxyphenylamino, chlorophenylamino, morpholino, piperidino, pyrrolidino, pyridylamino, methoxycarbonylamino, n-butoxycarbonylamino, phenoxycarbonylamino, methylcarbamoylamino, phenylcarbamoylamino, ethylthiocarbamoylamino, methylsufamoylamino, phenylsufamoylamino, acetylamino, ethylcarbonylamino, ethylthiocarbonylamino, cyclohexylcarbonylamino, benzoylamino, chloroacetylamino, methylsulfonylamino, and benzenesulfonylamino); a carbamoyl group of 1–18 (preferably 1–8) carbon atoms which may have one or more substituent groups (e.g., unsubstituted carbamoyl, methylcarbamoyl, ethylcarbamoyl, n-butylcarbamoyl, t-butylcarbamoyl, dimethylcarbamoyl, morpholinocarbamoyl, and pyrrolidinocarbamoyl); a sulfamoyl group having 0–18 (preferably 0–8) carbon atoms which may have one or more substituent groups (e.g., unsubstituted sulfamoyl, methylsulfamoyl, and phenylsulfamoyl); a halogen atom (e.g., fluorine, chlorine, and bromine); hydroxyl group; nitro group; cyano group; carboxyl group; and a heterocyclic group.

The substituent group represented by $R^3$ or $R^4$ preferably is a hydrogen atom or an alkyl group, more preferably a hydrogen atom. $R^3$ and $R^4$ may be combined to form a carbon ring or a heterocyclic ring, preferably a carbon ring. In such case, it is particularly preferred that $R^3$ and $R^4$ be combined with the pyridine rings to which the $R^3$ and $R^4$ are attached, to form a condensed aromatic ring.

Concrete examples of the quaternary ammonium salts of the formula (I) are given below.

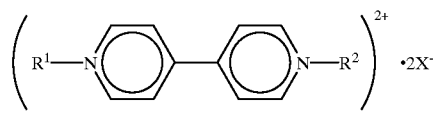

|        | $R^1$-                    | $R^2$-                    | $X^-$         |
|--------|---------------------------|---------------------------|---------------|
| (I-1)  | $CH_3$                    | $CH_3$                    | $Cl^-$        |
| (I-2)  | $C_2H_5$                  | $C_2H_5$                  | $Br^-$        |
| (I-3)  | $nC_3H_7$                 | $nC_3H_7$                 | $Br^-$        |
| (I-4)  | $nC_4H_9$                 | $nC_4H_9$                 | $Br^-$        |
| (I-5)  | $isoC_4H_9$               | $isoC_4H_9$               | $Br^-$        |
| (I-6)  | $nC_6H_{13}$              | $nC_6H_{13}$              | $Br^-$        |
| (I-7)  | $isoC_5H_{11}$            | $isoC_5H_{11}$            | $Br^-$        |
| (I-8)  | $PhCH_2$                  | $PhCH_2$                  | $Br^-$        |
| (I-9)  | $CH_3-CH=CH-CH_2$         | $CH_3-CH=CH-CH_2$         | $Br^-$        |
| (I-10) | $CH_2=CH$                 | $CH_2=CH$                 | $Br^-$        |
| (I-11) | $NC-(CH_2)_3-$            | $NC-(CH_2)_3-$            | $Br^-$        |
| (I-12) | $NCCH_2$                  | $NCCH_2$                  | $Cl^-$        |
| (I-13) | $CH_3$                    | $CH_3$                    | $CH_3SO_4^-$  |
| (I-14) | $EtO_2C-CH_2-$            | $EtO_2C-CH_2-$            | $Br^-$        |
| (I-15) | $HOCH_2CH_2-$             | $HOCH_2CH_2-$             | $Br^-$        |
| (I-16) | $EtOCH_2CH_2-$            | $EtOCH_2CH_2-$            | $I^-$         |
| (I-17) | $HOOC-CH_2CH_2-$          | $HOOCCH_2CH_2-$           | $Cl^-$        |
| (I-18) | $CH_3$                    | $nC_4H_9$                 | $Br^-$        |
| (I-19) | $CH_3$                    | $PhCH_2$                  | $Br^-$        |
| (I-20) | $CH_3$                    | $CH_3O_2C-CH=CH-CH_2$     | $I^-$         |

Remarks: Ph: phenyl, Et: ethyl,

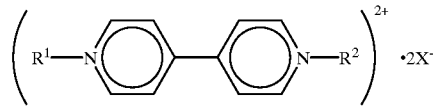

| No.    | $R^1$-               | $R^2$-                                    | $X^-$   |
|--------|----------------------|-------------------------------------------|---------|
| (I-21) | $CH_3$               | $H_2NC(O)-CH_2-$                          | $I^-$   |
| (I-22) | $CH_3$               | $EtO_2C(CN)CH$                            | $I^-$   |
| (I-23) | $CH_3COCH_2$         | $CH_3COCH_2$                              | $Br^-$  |
| (I-24) | $H_2NC(O)-CH_2-$     | $H_2NC(O)-CH_2-$                          | $Cl^-$  |
| (I-25) | $ClCH_2CH_2$         | $ClCH_2CH_2$                              | $Cl^-$  |

-continued

| | | | |
|---|---|---|---|
| (I-26) | CF₃CH₂ | CF₃CH₂ |  |
| (I-27) | PhCH₂ | PhCH₂ | BF₄⁻ |
| (I-28) | CH₃ | CH₃ | ClO₄⁻ |
| (I-29) | nC₆H₁₃ | nC₆H₁₃ | SbF₆⁻ |
| (I-30) | Ph | Ph | Cl⁻ |
| (I-31) | 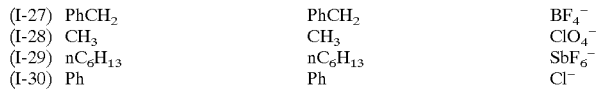 | | Cl⁻ |
| (I-32) | 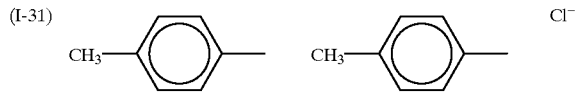 | | Cl⁻ |
| (I-33) | 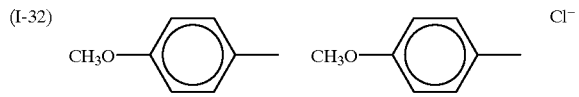 | | Cl⁻ |
| (I-34) | 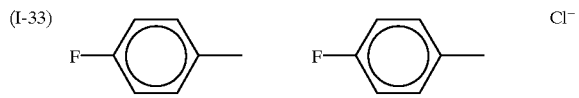 | | Cl⁻ |
| (I-35) | 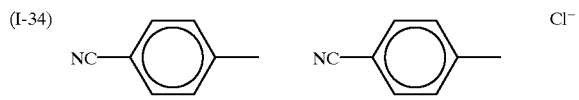 | | Cl⁻ |

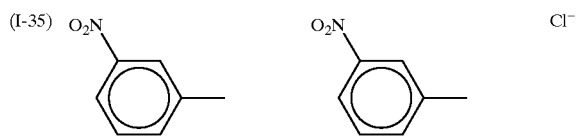

| | R¹- | R²- | X⁻ |
|---|---|---|---|
| (I-36) | CH₃ | CH₃ | Cl⁻ |
| (I-37) | C₂H₅ | C₂H₅ | Br⁻ |
| (I-38) | nC₃H₇ | nC₃H₇ | Br⁻ |
| (I-39) | nC₄H₉ | nC₄H₉ | Br⁻ |
| (I-40) | isoC₄H₉ | isoC₄H₉ | Br⁻ |
| (I-41) | nC₆H₁₃ | nC₆H₁₃ | Br⁻ |
| (I-42) | isoC₅H₁₁ | isoC₅H₁₁ | Br⁻ |
| (I-43) | PhCH₂ | PhCH₂ | Br⁻ |
| (I-44) | CH₃—CH=CH—CH₂ | CH₃—CH=CH—CH₂ | Br⁻ |
| (I-45) | CH₂=CH | CH₂=CH | Br⁻ |
| (I-46) | NC—(CH₂)₃— | NC—(CH₂)₃— | Br⁻ |
| (I-47) | NCCH₂ | NCCH₂ | Cl⁻ |
| (I-48) | CH₃ | CH₃ | CH₃SO₄⁻ |
| (I-49) | EtO₂C—CH₂— | EtO₂C—CH₂— | Br⁻ |
| (I-50) | HOCH₂CH₂— | HOCH₂CH₂— | Br⁻ |
| (I-51) | EtOCH₂CH₂— | EtOCH₂CH₂— | I⁻ |
| (I-52) | HOOC—CH₂CH₂— | HOOCCH₂CH₂— | Cl⁻ |
| (I-53) | CH₃ | nC₄H₉ | Br⁻ |
| (I-54) | CH₃ | PhCH₂ | Br⁻ |
| (I-55) | CH₃ | CH₃O₂C—CH=CH—CH₂ | I⁻ |

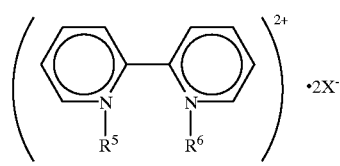

-continued
| No. | R⁵- | R⁶- | X⁻ |
|---|---|---|---|
| (I-56) | CH₃ | H₂NC(O)—CH₂— | I⁻ |
| (I-57) | CH₃ | EtO₂C(CN)CH | I⁻ |
| (I-58) | CH₃COCH₂ | CH₃COCH₂ | Br⁻ |
| (I-59) | H₂NC(O)—CH₂— | H₂NC(O)—CH₂— | Cl⁻ |
| (I-60) | ClCH₂CH₂ | ClCH₂CH₂ | Cl⁻ |
| (I-61) | CF₃CH₂ | CF₃CH₂ | CH₃-C₆H₄-SO₃⁻ |
| (I-62) | PhCH₂ | PhCH₂ | BF₄⁻ |
| (I-63) | CH₃ | CH₃ | ClO₄⁻ |
| (I-64) | nC₆H₁₃ | nC₆H₁₃ | SbF₆⁻ |
| (I-65) | Ph | Ph | Cl⁻ |
| (I-66) | CH₃-C₆H₄- | CH₃-C₆H₄- | Cl⁻ |
| (I-67) | CH₃O-C₆H₄- | CH₃O-C₆H₄- | Cl⁻ |
| (I-68) | F-C₆H₄- | F-C₆H₄- | Cl⁻ |
| (I-69) | NC-C₆H₄- | NC-C₆H₄- | Cl⁻ |
| (I-70) | O₂N-C₆H₄- | O₂N-C₆H₄- | Cl⁻ |
I-71
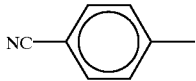
I-72
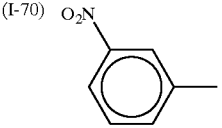

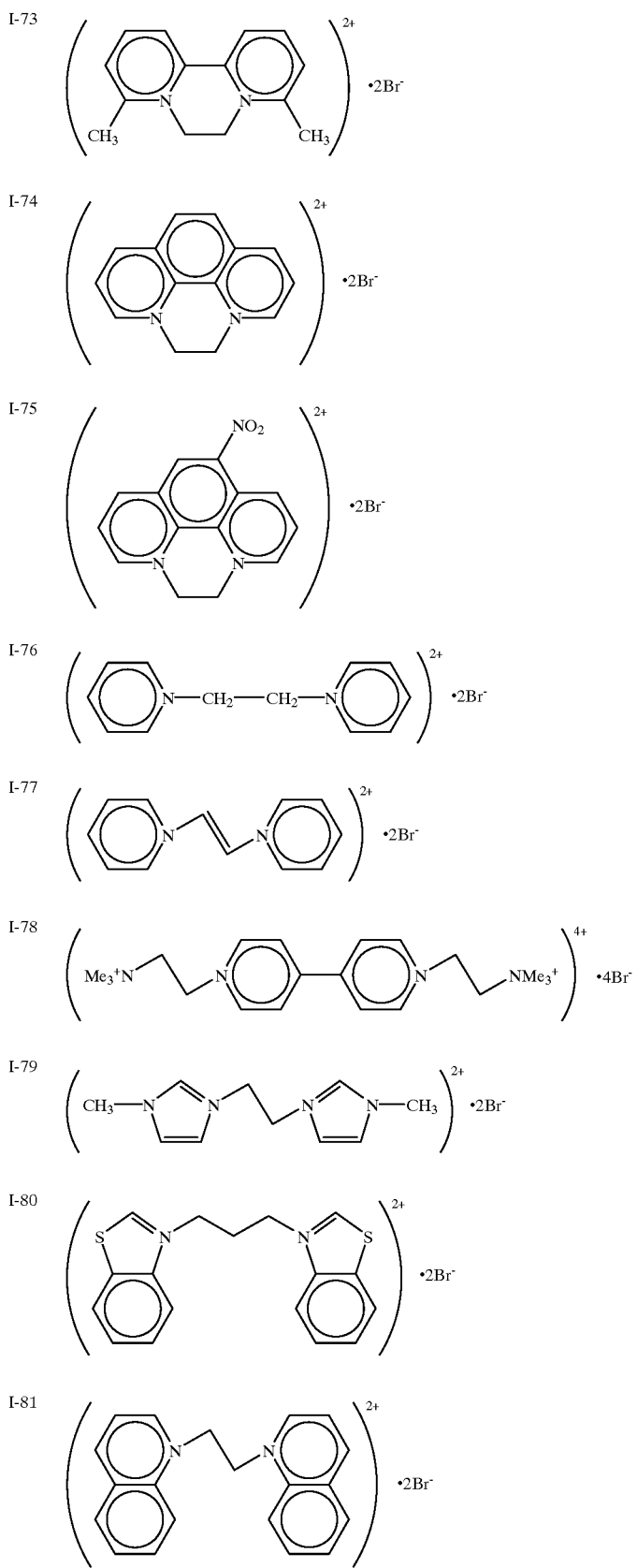

I-82

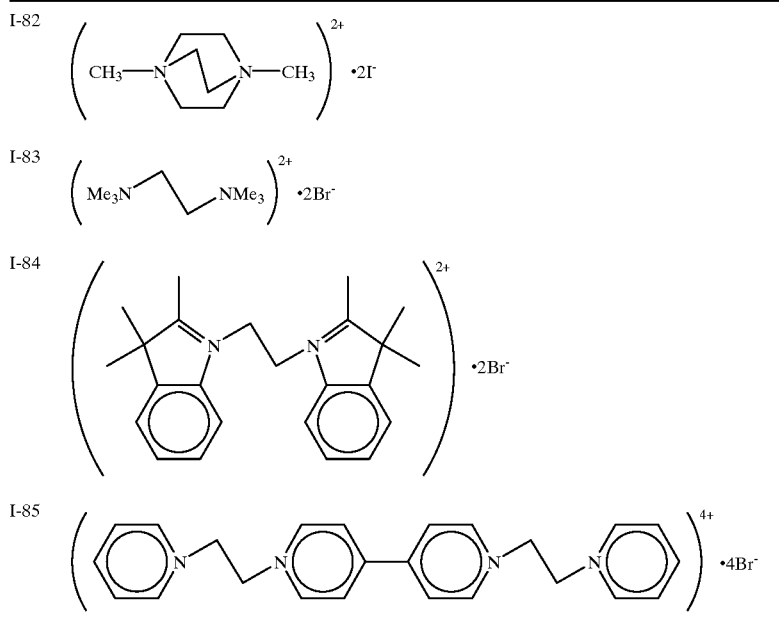

I-83

I-84

I-85

The compound of the formula (I) of the invention can be employed singly or in combination with two or more compounds. Further, the compound of the invention can also be employed in combination with other known quenchers. Examples of the known quenchers include a metal complex represented by the formula (III), (IV) or (V) of Japanese Patent Provisional Publication No. H3-224793; diimmonium salt; aminium salt; and nitroso compounds described in Japanese Patent Provisional Publications Nos. H2-300287 and H2-300288.

The amount of the compound of the formula (I) (and other quenchers, if used in combination) used for the invention is in a range of 1 to 200 weight parts, preferably 1 to 100 weight parts, and more preferably 1 to 50 weight parts, per 100 weight part of the organic dye.

The recording dye layer of the invention comprises a quaternary ammonium salt of the formula (I) and an organic dye. Examples of the organic dyes include cyanine dyes, oxonol dyes, merocyanine dyes, phthalocyanine dyes, pyrylium dyes, thiopyrylium dyes, triarylmethane dyes, polymethine dyes, squalium dyes, azulenium dyes, naphthoquinone dyes, anthraquinone dyes, indophenol dyes, indoaniline dyes, aminium/diimmonium dyes, and pyrane dyes. Among the above, the organic dye preferably employable for the invention is a cyanine dye having the following formula (IV) or an oxonol dye having the following formula (V-1) or (V-2):

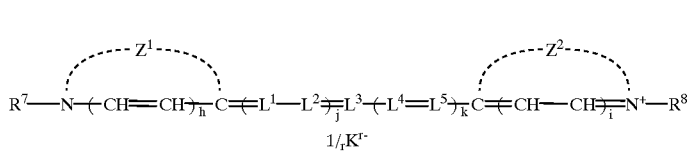
(IV)

in which $Z^1$ and $Z^2$ may be the same or different and each of $Z^1$ and $Z^2$ independently represents a group of atoms required for forming a nitrogen-containing 5- or 6-membered heterocyclic ring; each of $R^7$ and $R^8$ independently represents an alkyl group which may have one or more substituent groups; each of $L^1$, $L^2$, $L^3$, $L^4$ and $L^5$ independently represents a methine group which may have one or more substituent groups; each of j, k, h and i independently represents an integer of 0 or 1; and $K^{r-}$ (in which r is an integer of one or more) represents an anion required for neutralizing the charge of the molecule, under the condition that there is no $K^{r-}$ in the case that an intramolecular salt is formed.

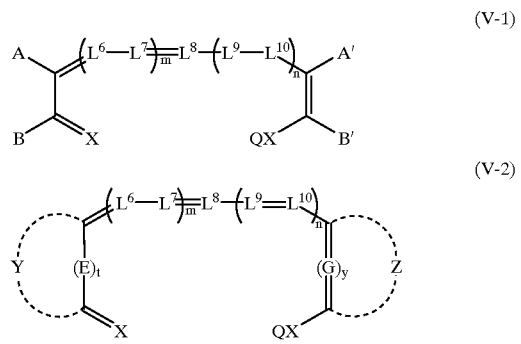

n which each of A, A', B and B' independently represents a substituent group; each of Y and Z independently represents a group of atoms required for forming a carbon ring or a heterocyclic ring; each of E and G independently represents a group of atoms required for forming a conjugated double bond chain; each of X and X' independently represents oxygen, nitrogen or $C(CN)_2$; each of $L^6$, $L^7$, $L^8$, $L^9$ and $L^{10}$ independently represents a methine group which may have one or more substituent groups; Q represents hydrogen atom or a cation (including a quaternary ammonium); each of m and n independently represents an integer of 0, 1 or 2; each of t and y independently represents an integer of 0 or 1; and k represents an integer.

The cyanine dye having the formula (IV) is further described below in more detail.

Each of $Z^1$ and $Z^2$ in the formula (IV) forms a nucleus. Examples of such nucleus include 3,3-dialkylindolenine nucleus, 3,3-dialkylbenzoindolenine nucleus, thiazole nucleus, benzothiazole nucleus, naphtothiazole nucleus, thiazoline nucleus, oxazole nucleus, benzooxazole nucleus, naphthooxazole nucleus, oxazoline nucleus, selenazole nucleus, tellurazole nucleus, benzotellurazole nucleus, naphthotellurazole nucleus, tellurazoline nucleus, imidazole nucleus, benzoimidazole nucleus, naphthoimidazole nucleus, pyridine nucleus, quinoline nucleus, isoquinoline nucleus, imidazo(4,5-b)quinozaline nucleus, oxadiazole nucleus, thiadiazole nucleus, tetrazole nucleus, and pyrimidine nucleus.

Each of the 5- or 6-membered nitrogen-containing heterocyclic rings may have substituent groups, if possible. Examples of the substituent groups include an alkyl group of 1–8 carbon atoms which may have one or more substituent groups (e.g., methyl, ethyl, propyl, isopropyl, n-butyl, isobutyl, sec-butyl, t-butyl, cyclohexyl, methoxyethyl, ethoxyethyl, ethoxycarbonylmethyl, ethoxycarbonylethyl, cyanoethyl, diethylaminoethyl, hydroxyethyl, chloroethyl, acetoxyethyl, and trifluoromethyl); an aralkyl group of 7–12 carbon atoms which may have substituent groups (e.g., benzyl and 2-carboxybenzyl); an aryl group of 6–18 carbon atoms which may have substituent groups (e.g., phenyl, 4-methylphenyl, 4-methoxyphenyl, and 4-chlorophenyl); an acyl group of 2–6 carbon atoms which may have substituent groups (e.g., acetyl, propionyl, butanoyl, and chloroacetyl); an alkoxycarbonyl group of 2–6 carbon atoms (e.g., methoxycarbonyl and ethoxycarbonyl); an aryloxycarbonyl group of 7–12 carbon atoms (e.g., phenoxycarbonyl, 4-methylphenoxycarbonyl, and 4-methoxyphenoxycarbonyl); an alkylthio group of 1–8 carbon atoms (e.g., methylthio and ethylthio); an arylthio group of 6–10 carbon atoms (e.g., phenylthio); an alkoxy group of 1–4 carbon atoms which may have one or more substituent groups (e.g., methoxy, ethoxy, b-butoxy, and methoxyethoxy); an aryloxy group of 6–10 carbon atoms which may have one or more substituent groups (e.g., phenoxy, p-methoxyphenoxy); an acyloxy group of 2–8 carbon atoms which may have one or more substituent groups (e.g., acetoxy, ethylcarbonyloxy, cyclohexylcarbonyloxy, benzoyloxy, and chloroacetyloxy); a carbamoyloxy group of 2-carbon atoms which may have substituent groups (e.g., methylcarbamoyloxy and diethylcarbamoyloxy); an amino group having 0–18 carbon atoms which may have one or more substituent groups (e.g., unsubstituted amino, methylamino, dimethylamino, diethylamino, phenylamino, methoxyphenylamino, chlorophenylamino, morpholino, piperidino, pyrrolidino, pyridylamino, methoxycarbonylamino, n-butoxycarbonylamino, phenoxycarbonylamino, methylcarbamoylamino, phenylcarbamoylamino, ethylthiocarbamoylamino, methylsufamoylamino, ethylsufamoylamino, acetylamino, ethylcarbonylamino, methylthiocarbonylamino, cyclohexylcarbonylamino, benzoylamino, and chloroacetylamino); a carbamoyl group of 1–8 carbon atoms which may have one or more substituent groups (e.g., unsubstituted carbamoyl, methylcarbamoyl, ethylcarbamoyl, n-butylcarbamoyl, t-butylcarbamoyl, dimethylcarbamoyl, morpholinocarbamoyl, and pyrrolidinocarbamoyl); a sulfamoyl group having 0–8 carbon atoms which may have substituent groups (e.g., unsubstituted sulfamoyl, methylsulfamoyl, dimethylsulfamoyl, and phenylsulfamoyl); an alkylsulfonyl group of 1–8 carbon atoms which may have one or more substituent groups (e.g., methanesulfonyl and ethanesulfonyl); an arylsulfonyl group of 6–10 carbon atoms which may have one or more substituent groups (e.g., benzenesulfonyl and p-toluenesulfonyl); a sulfinyl group of 1–8 carbon atoms (e.g., methanesulfinyl, ethanesulfinyl, and octanesulfinyl); a halogen atom (e.g., fluorine, chlorine, and bromine); sulfo group; hydroxyl group; nitro group; cyano group; carboxyl group; and a heterocyclic group (e.g., groups derived from oxazole, benzoxazole, 5-carboxybenzoxazole, thiazole, imidazole, pyridine, sulfolane, furan, thiophene, pyrazol, pyrrole, chroman, and coumarin).

Among the above, 3,3-dialkylindolenine nucleus and 3,3-dialkylbenzoindolenine nucleus are preferably employed for $Z^1$ or $Z^2$.

Each of $R^7$ and $R^8$ in the formula (IV) independently represents an alkyl group, preferably an alkyl group of 1–18 (preferably 1–8) carbon atoms which may have one or more substituent groups and which may be in the form of straight-chain or branched-chain or cyclic structure. Examples of the substituent groups are the same as those described hereinbefore for the nitrogen-containing heterocyclic rings. Among them, preferred groups are unsubstituted alkyl groups, or alkyl groups substituted with aryl group, halogen atom, hydroxyl group, alkoxy group, acyloxy group, amino group, oxycarbonyl group, carboxyl group or sulfo group. Examples of the preferable substituent groups include methyl, ethyl, propyl, butyl, isobutyl, 2-ethylhexyl, octyl, benzyl, 2-phenylethyl, 2-hydroxyethyl, 3-hydroxybutyl, 2-carboxyethyl, 3-carboxylpropyl, 4-carboxybutyl, carboxymethyl, 2-methoxyethyl, 2-(2-methoxy)ethyl, 2-acetoxyethyl, carboethoxymethyl, and 2-methanesulfonylaminoethyl.

Each of $L^1$, $L^2$, $L^3$, $L^4$ and $L^5$ independently represents a methine group which may have one or more substituent groups. Each of the methine groups may be the same or different. Examples of the substituent groups are the same as those described hereinbefore for the nitrogen-containing heterocyclic rings, and preferred examples of them are also the same. The substituent groups may be combined with each other to form a 5-, 6- or 7-membered ring, and also may be combined with auxochrome to form a ring. Examples of the 5-, 6- or 7-membered rings include cyclopentene ring, 1-dimethylaminocyclopentene ring, 1-diphenylaminocyclopentene ring, cyclohexene ring, 1-chlorocyclohexene ring, isophorone ring, 1-morpholinocyclopentene ring and cycloheptene ring.

$K^{r-}$ represents an anion which may be an inorganic anion or an organic anion. Examples of the anion include a halide anion (e.g., fluoride ion, chloride ion, bromide ion, and iodide ion); a sulfonate ion (e.g., methanesulfonate ion, trifluoromethanesulfonate ion, methylsulfate ion, p-toluenesulfonate ion-, p-chlorobenzenesulfonate ion, 1,3-benzenedisulfonate ion, 1,5-naphthalenedisulfonate ion, and 2,6-naphthalenedisulfonate ion); sulfate ion; thiocyanate ion; perchlorate ion; tetrafluoroborate ion; picrate ion; acetate ion; metal complex ion, for instance,

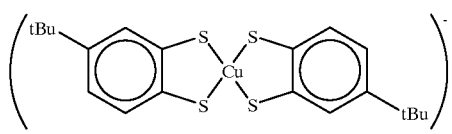

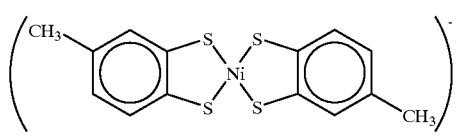

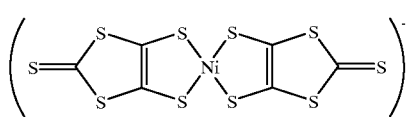

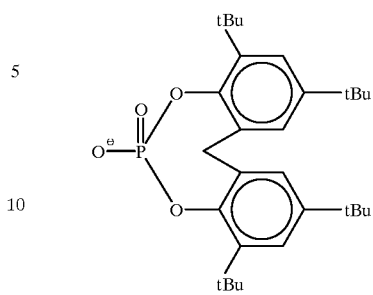

and phosphate ion (e.g., hexafluorophosphate ion,

In the case that an intramolecular salt is formed to neutralize the charge of the molecule, there is no $K^{r-}$ in the formula (IV).

Two kinds of the compound of the formula (IV) may be combined to form a bis-structure.

Non-restrictive concrete examples of the compounds of the formula (IV) are as follows:

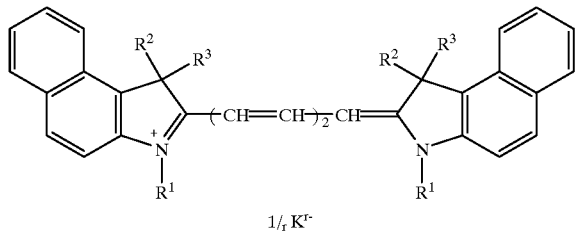

| No. | $R^1$ | $R^2$ | $R^3$ | $1/_r K^{r-}$ |
|---|---|---|---|---|
| IV-1 | $CH_3$ | $CH_3$ | $CH_3$ | $ClO_4-$ |
| IV-2 | $CH_3$ | $CH_3$ | $C_2H_5$ | $ClO_4-$ |
| IV-3 | $CH_3$ | $CH_3$ | $C_2H_5$ | $PF_6-$ |
| IV-4 | $C_2H_5$ | $CH_3$ | $CH_3$ | $CH_3-\!\!\bigcirc\!\!-SO_3^-$ |
| IV-5 | $nC_3H_7$ | $CH_3$ | $CH_3$ | $CF_3SO_3-$ |
| IV-6 | $nC_4H_9$ | $CH_3$ | $CH_3$ | $ClO_4-$ |
| IV-7 | $nC_4H_9$ | $CH_3$ | $CH_3$ | (Ni dithiolene complex with OCH$_3$ groups) |
| IV-8 | $-CH_2CH(CH_3)_2$ | $CH_3$ | $CH_3$ | $ClO_4-$ |
| IV-9 | $CH_2CH_2CF_2H$ | $CH_3$ | $CH_3$ | $ClO_4-$ |
| IV-10 | $CH_2CH(C_2H_5)-n\text{-}C_4H_9$ | $CH_3$ | $CH_3$ | $CF_6-$ |
| IV-11 | $CH_3$ | $CH_3$ | $CH_3$ | $CH_3-\!\!\bigcirc\!\!-SO_3^-$ |
| IV-12 | $CH_2CH_2OC_2H_5$ | $CH_3$ | $CH_3$ | $ClO_4-$ |
| IV-13 | $nC_4H_9$ | $CH_3$ | $C_2H_5$ | $ClO_4-$ |
| IV-14 | $nC_4H_9$ | $CH_3$ | $C_2H_5$ | $PF_6-$ |
| IV-15 | $C_2H_5$ | $CH_3$ | $C_2H_5$ | $ClO_4-$ |

-continued

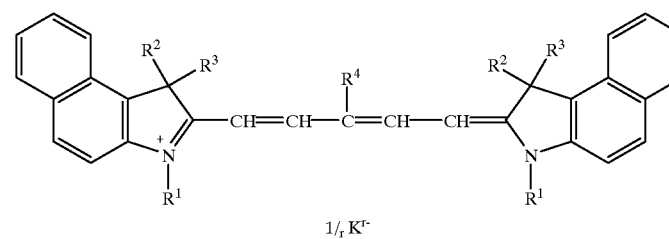

1/<sub>r</sub>K<sup>r-</sup>

| No. | R¹ | R² | R³ | R⁴ | 1/$_r$K$^{r-}$ |
|---|---|---|---|---|---|
| IV-16 | CH$_3$ | CH$_3$ | CH$_3$ | CH$_3$ | ClO$_4$— |
| IV-17 | C$_2$H$_5$ | CH$_3$ | CH$_3$ | CH$_3$ | ClO$_4$— |
| IV-18 | nC$_3$H$_7$ | CH$_3$ | CH$_3$ | CH$_3$ | ClO$_4$— |
| IV-19 | nC$_4$H$_9$ | CH$_3$ | CH$_3$ | CH$_3$ | ClO$_4$— |
| IV-20 | CH$_3$ | CH$_3$ | CH$_3$ | 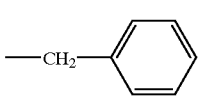 | ClO$_4$— |
| IV-21 | CH$_3$ | CH$_3$ | CH$_3$ | 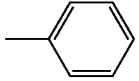 | ClO$_4$— |
| IV-22 | CH$_3$ | CH$_3$ | CH$_3$ | 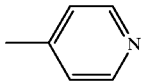 | ClO$_4$— |
| IV-23 | CH$_3$ | CH$_3$ | CH$_3$ | 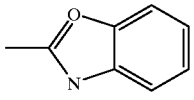 | ClO$_4$— |
| IV-24 | CH$_3$ | CH$_3$ | CH$_3$ | Br | ClO$_4$— |
| IV-25 | CH$_3$ | CH$_3$ | CH$_3$ | Cl | ClO$_4$— |
| IV-26 | CH$_2$CO$_2$C$_2$H$_5$ | CH$_3$ | CH$_3$ | H | ClO$_4$— |
| IV-27 | 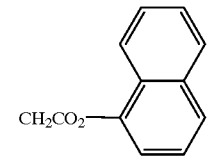 | CH$_3$ | CH$_3$ | H | ClO$_4$— |
| IV-27 | 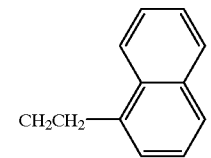 | CH$_3$ | CH$_3$ | H | ClO$_4$— |

IV-28

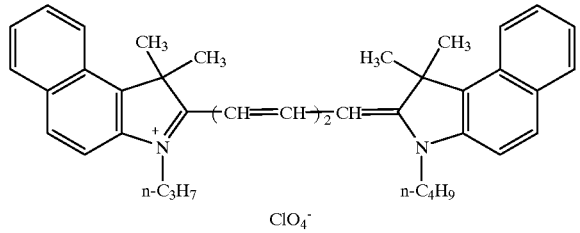

-continued

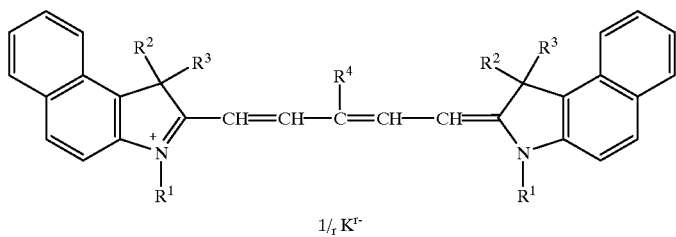

| No. | R¹ | R² | R³ | R⁴ | $1/_r K^{r-}$ |
|---|---|---|---|---|---|
| IV-29 | CH₃ | CH₃ | CH₃ | H | CH₃-C₆H₄-SO₃⁻ |
| IV-30 | CH₃ | CH₃ | C₂H₅ | H | ClO₄— |
| IV-31 | C₂H₅ | CH₃ | CH₃ | CH₃ | ClO₄— |

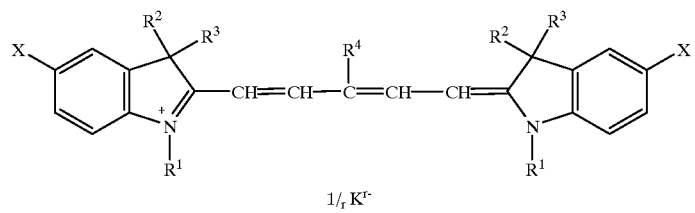

| No. | R¹ | R² | R³ | R⁴ | X | $1/_r K^{r-}$ |
|---|---|---|---|---|---|---|
| IV-32 | C₂H₅ | CH₃ | CH₃ | CH₂-C₆H₅ | H | ClO₄— |
| IV-33 | nC₃H₇ | CH₃ | CH₃ | H | H | ClO₄— |
| IV-34 | CH₂CH(CH₃)₂ | CH₃ | CH₃ | H | H | PF₆— |
| IV-35 | nC₄H₉ | CH₃ | CH₃ | H | CH₃ | I⁻ |
| IV-36 | CH₂CH₂OC₂H₅ | CH₃ | CH₃ | H | Cl | ClO₄— |
| IV-37 | nC₃H₇ | CH₃ | CH₃ | CH₃ | OCH₃ | ClO₄— |
| IV-38 | CH₂CH(CH₃)₂ | CH₃ | CH₃ | H | SO₂NH₂ | ClO₄— |

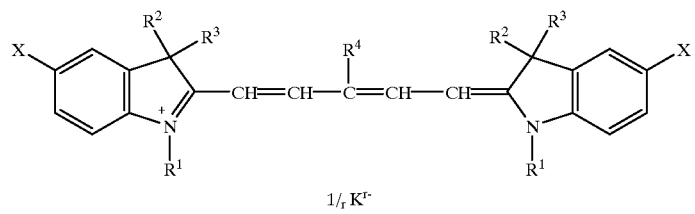

| No. | R¹ | R² | R³ | R⁴ | X | $1/_r K^{r-}$ |
|---|---|---|---|---|---|---|
| IV-39 | nC₃H₇ | CH₃ | CH₃ | H | H | *1 |
| IV-40 | nC₄H₉ | CH₃ | CH₃ | C₆H₅ | H | ClO₄— |
| IV-41 | nC₃H₇ | CH₃ | CH₃ | C₂H₅ | Cl | PF₆— |
| IV-42 | CH₂CH(CH₃)₂ | CH₃ | CH₃ | H | —CO₂C₂H₅ | I⁻ |
| IV-43 | nC₃H₇ | CH₃ | C₂H₅ | H | H | ClO₄— |

*1 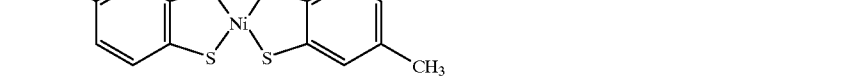

-continued
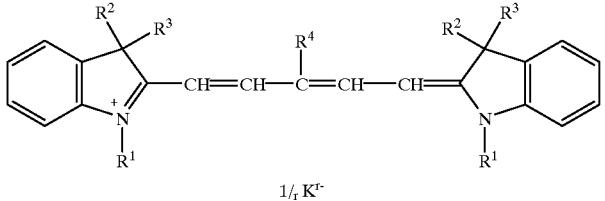
| No. | R¹ | R² | R³ | R⁴ | 1/rKr⁻ |
|---|---|---|---|---|---|
| IV-44 | nC₃H₇ | CH₃ | C₂H₅ | H | PF₆— |
| IV-45 | C₂H₅ | CH₃ | C₂H₅ | H | ClO₄— |
| IV-46 | nC₄H₉ | CH₃ | C₂H₅ | H | ClO₄— |
| IV-47 | CH₃ | CH₃ | CH₃ | Br | ClO₄— |
| IV-48 | CH₃ | CH₃ | CH₃ | Cl | ClO₄— |
| IV-49 | CH₃ | CH₃ | CH₃ | 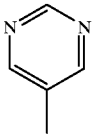 | I⁻ |
IV-50
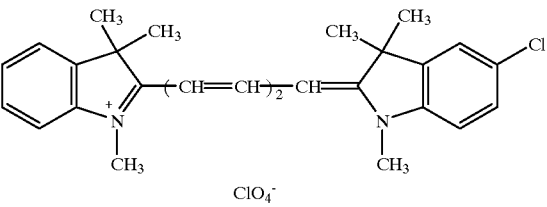
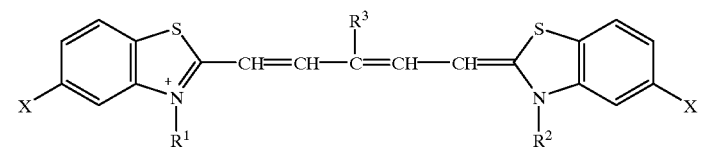
| No. | R¹ | R² | R³ | X | 1/rKr⁻ |
|---|---|---|---|---|---|
| IV-51 | C₂H₅ | C₂H₅ | CH₃ | H | I⁻ |
| IV-52 | CH₃ | CH₃ | H | 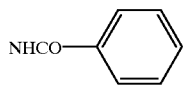 | I⁻ |
| IV-53 | CH₃ | CH₃ | H | CH₃ | I⁻ |
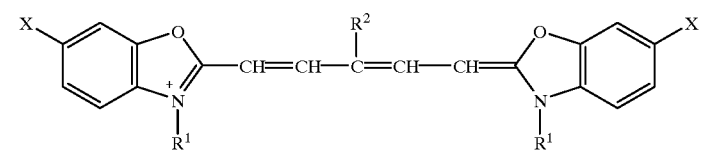
| No. | R¹ | R² | X | 1/rKr⁻ |
|---|---|---|---|---|
| IV-54 | CH₃ | CH₃ | H | I⁻ |
| IV-55 | C₂H₅ | C₂H₅ | Br | I⁻ |
| IV-56 | —(CH₂)₂CO₂H | Br | 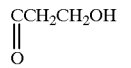 | Na⁺ |

IV-57
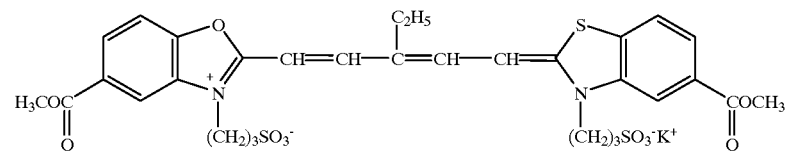
IV-58
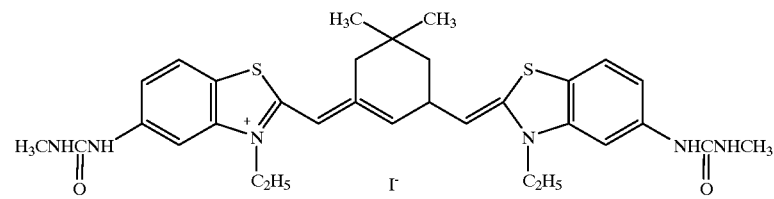
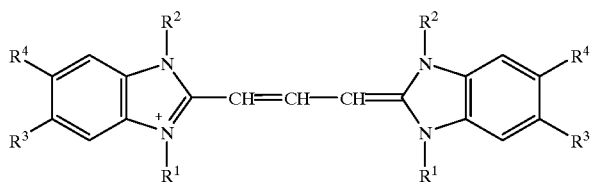
| No. | R¹ | R² | R³ | R⁴ |
|---|---|---|---|---|
| IV-59 | $(CH_2)_4SO_3$— | $C_2H_5$ | $CF_3$ | Cl |
| IV-60 | $(CH_2)_4SO_3$— | $C_2H_5$ | CN | Cl |
IV-61
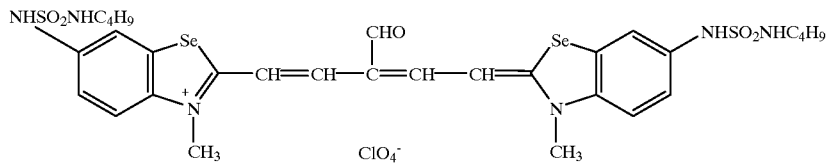
IV-62
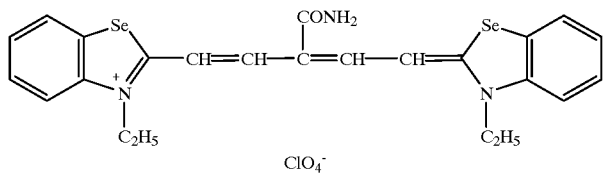
IV-63
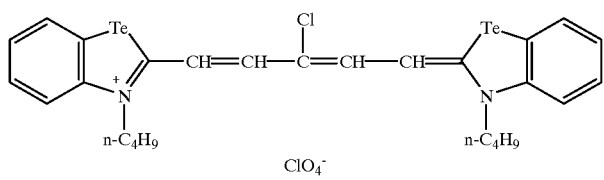
IV-64

-continued
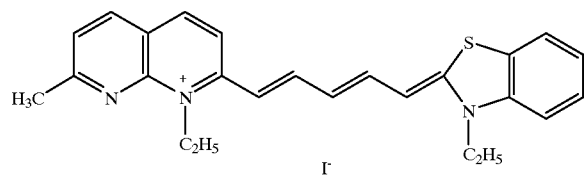
IV-65
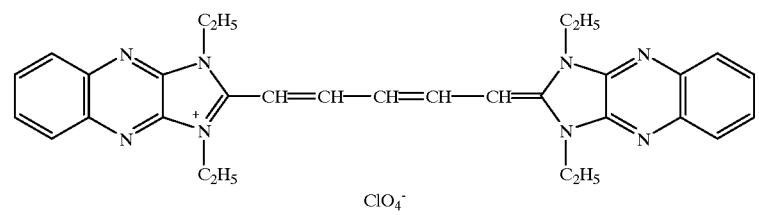
IV-66
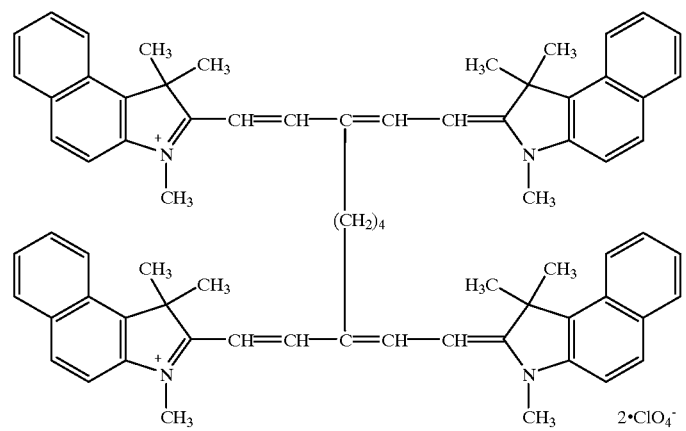
IV-67
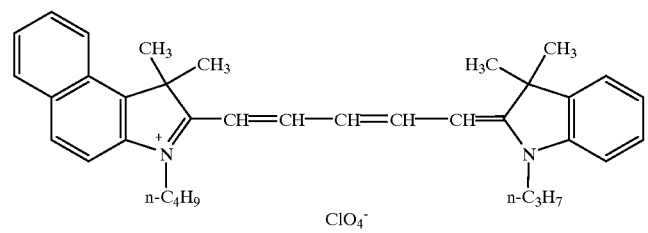
IV-68
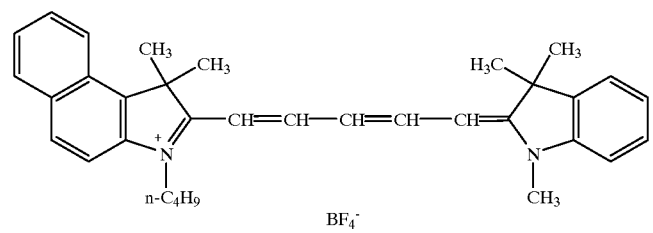
IV-69

-continued

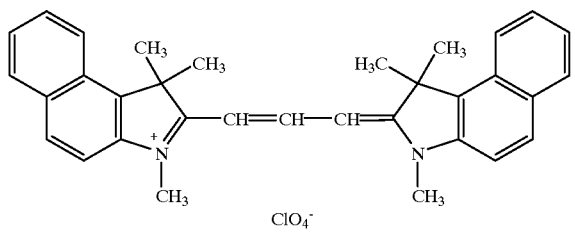

The compound represented by the formula (IV) can be prepared in the manner described in the following texts: "Heterocyclic Compounds-Cyanine dyes and Related Compounds" written by F. M. Hamer (John Wiley & Sons, New York, London, published in 1964); "Heterocyclic Compounds-Special Topics in Heterocyclic Chemistry", Chapter 18, Section 14, pp. 482–515, written by D. M. Sturmer (John Wiley & Sons, New York, London, published in 1977); and "Rodd's Chemistry of Carbon Compounds, 2nd edition, part B", Chapter 15, pp. 369–422 (Elsevir Science Publishing Company Inc., New York).

The oxonol dye having the formula (V-1) or (V-2) is described below in more detail.

The substituent groups represented by A, A', B and B' are the same as those described hereinbefore for the nitrogen-containing heterocyclic rings of the formula (IV). Each of the substituent groups represented by A and A' preferably has s Hammett's substituent constant (as) of not less than 0.2. The values of Hammett's substituent constant (as) are set forth in, for instance, Chem. Rev., 91, 165(1991). Examples of the particularly preferred substituent groups include cyano group, nitro group, alkoxycabonyl group, acyl group, carbamoyl group, sulfamoyl group and sulfonyl group. Examples of the preferred substituent groups represented by B and B' include alkyl group, aryl group, alkoxy group, and amino group.

Each of the group of atoms [—C—(E)$_t$—C(=X)—] combined with Y and the group of atoms [—C=(G)$_y$=C(—X'Q)—] combined with to Z forms a conjugated system, and therefore each of the carbon ring or heterocyclic ring composed of [—C—(E)$_t$—C(=X)—] and Y and that of [—C=(G)$_y$=C(—X'Q)—] and Z has a resonating structure.

Each of the carbon ring or heterocyclic ring of [—C—(E)$_t$—C(=X)—] and Y and that of [—C=(G)$_y$=C(—X'Q)—] and Z preferably is a 4- to 7-membered ring, more preferably a 5- or 6-membered ring. Each ring may form a condensed-ring with other 4- to 7-membered rings and may have one or more substituent groups. Examples of the substituent groups are the same as those described hereinbefore for A, A', B and B'. Examples of the preferred hetero-atoms in the heterocyclic ring include B, N, O, S, Se and Te. N, O and S are particularly preferred. Each of the numbers represented by t and y is independently 0 or 1, and preferably both of them are 0.

Each of X and X' independently represents oxygen, nitrogen, or C(CN)$_2$, preferably oxygen.

Examples of the carbon ring composed of a set of [—C—(E)$_t$—C(=X)—] and Y or a set of [—C=(G)$_y$=C(—X'Q)—] and Z include the following rings (in which each of Ra and Rb independently represents hydrogen atom or a substituent group):

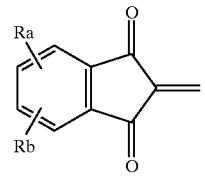

A-1

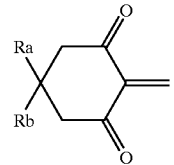

A-2

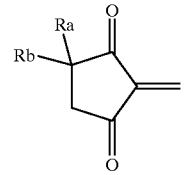

A-3

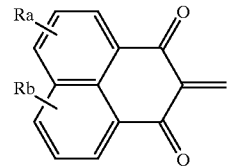

A-4

The compounds of A-1 and A-4 are preferred.

Examples of the heterocyclic ring composed of a set of [—C—(E)$_t$—C(=X)—] and Y or a set of [—C=(G)$_y$=C(—X'Q)—] and Z include the following rings (in which each of Ra, Rb and Rc independently represents hydrogen atom or a 30 substituent group):

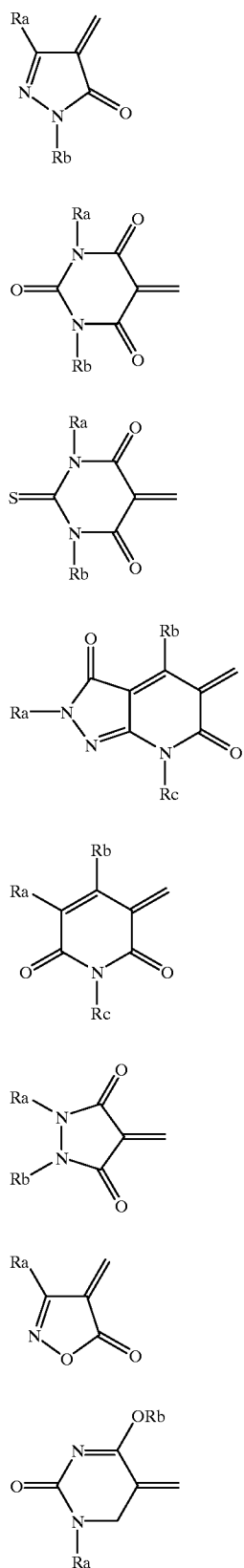
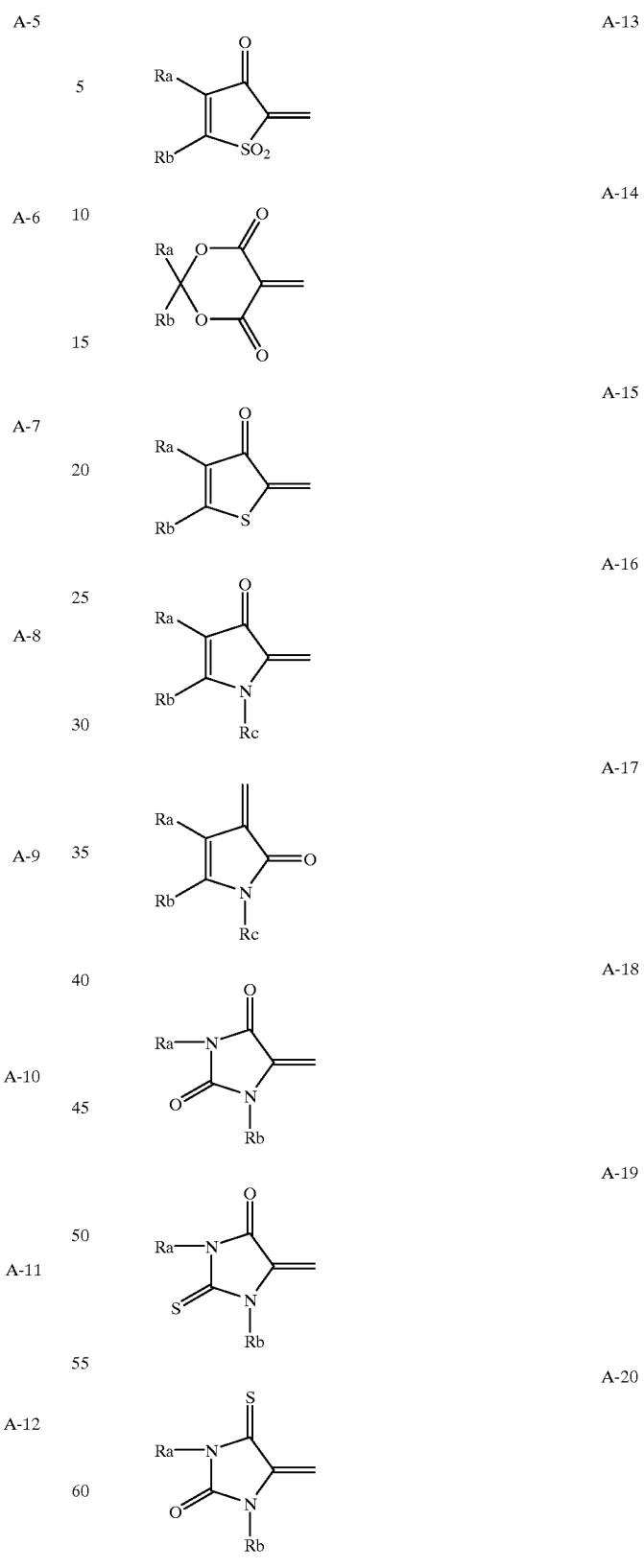

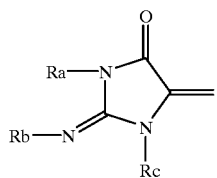
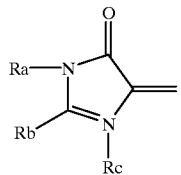
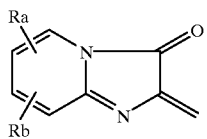
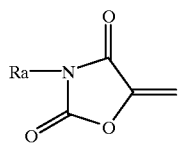
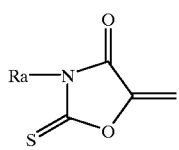
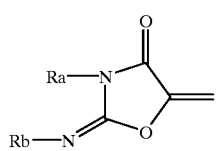
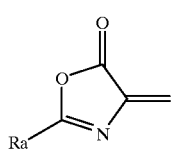
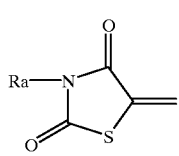
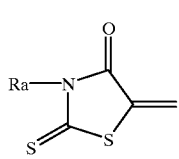
A-21
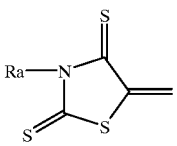
A-22
A-23
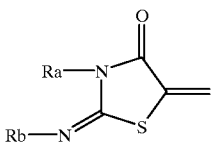
A-24
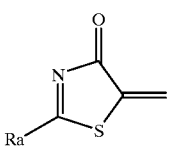
A-25
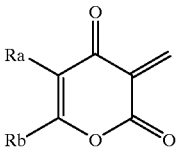
A-26
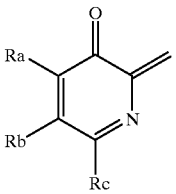
A-27
A-28
A-29
A-30
A-31
A-32
A-33
A-34
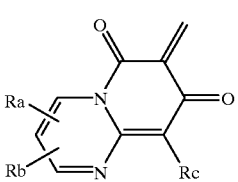
A-35
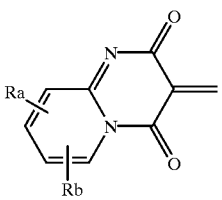
A-36
A-37
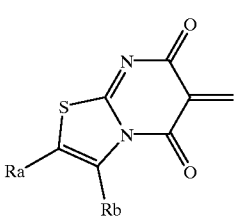

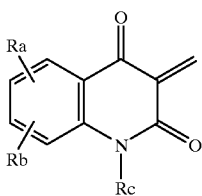  A-38

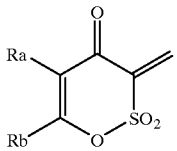  A-39

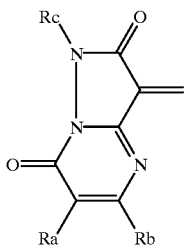  A-40

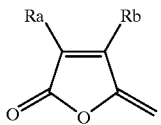  A-41

Among the above, the compounds of A-5, A-6 and A-7 are preferred.

Each of Ra, Rb and Rc in the above formulas independently represents a hydrogen atom or a substituent group.

Each of the substituent groups represented by Ra, Rb and Rc has the same meaning as that described hereinbefore for A, A', B and B'.

Each of $L^6$, $L^7$, $L^8$, $L^9$ and $L^{10}$ independently represents a methine group which may have one or more substituent groups. Each of the methine groups of $L^6$, $L^7$, $L^8$, $L^9$ and $L^{10}$ may be the same or different. Examples of the substituent groups are the same as those described hereinbefore for A, A', B and B'. Among them, the preferred substituent groups are an alkyl group, an aralkyl group, an aryl group, alkoxy group, an aryloxy group, a halogen atom, an amino group, a carbamoyl group and a heterocyclic group.

The substituent groups may be combined to form a 5- to 7-membered ring (e.g., cyclopentene ring, 1-dimethylaminocyclopentene ring, 1-diphenylaminocyclopentene ring, cyclohexene ring, 1-chlorocyclohexene ring, isophorone ring, 1-morpholinocyclopentene ring, and cycloheptene ring).

Q represents a hydrogen atom or a monovalent cation. Examples of the cations include alkali metal ions such as sodium ion, potassium ion, and lithium ion; unsubstituted ammonium ion; and organic compound ions such as trialkylammonium ion, tetraalkylammonium ion, and pyridinium ion.

The dye compound represented by the formula (V-1) or (V-2) can be prepared by condensation reaction between the corresponding active methylene compound (e.g., pyrazolone, thiobarbituric acid, barbituric acid, indandione, and hydroxyphenalenone) and the methine source to introduce the methine group or polymethine group into the methine dye. The methine sources are described in detail in Japanese Patent Publication Nos. 39-22069, 43-3504, 52-38056, 54-38129, 55-10059, 58-35544; Japanese Patent Provisional Publication Nos. 49-99620, 52-92716, 59-16834, 63-316853, 64-40827; British Patent 1133986; U.S. Pat. Nos. 3,247,127, 4,042,397, 4,181,225, 5,213,956 and 5,260,179. Concrete examples of the methine source for introducing of monomethine group include ortho esters (e.g., ethyl orthoformate and ethyl orthoacetate) and N,N-diphenylformamidine hydrochloride. Examples of the methine source for introducing of trimethine chain include trimethoxypropane, 1,1,3,3-tetramethoxypropane and malonaldehydodianyl hydrochloride (and the derivatives of those above described). Examples of the methine sources for introducing of pentamethine chain include glutaconaldehydodianyl hydrochloride and 1-(2,4-dinitrophenyl)-pyridinium chloride (and the derivatives of those above described).

The dye compound having the formula (V-1) or (V-2) generally consists of an anion part and a cation part.

Concrete examples of preferred anion parts of the dye compounds of the formulas (V-1) and (V-2) are illustrated below.

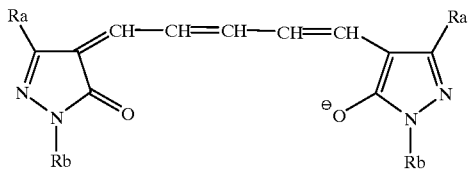

| No. | Ra | Rb |
|---|---|---|
| B-1 | COOEt | H |
| B-2 | COOEt | $CH_3$ |
| B-3 | COOEt | ⌬ (phenyl) |
| B-4 | COOEt | $CH_2CH_2OH$ |

-continued
| No. | | |
|---|---|---|
| B-5 | COOCH₃ | 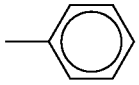 |
| B-6 | COOEt | 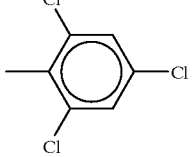 |
| B-7 | COOEt | CONHC₄H₉⁽ⁿ⁾ |
| B-8 | COOEt | CONHPh |
| B-9 | CN | 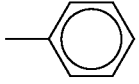 |
| B-10 | COCH₃ | 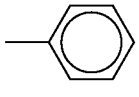 |
| B-11 | CF₃ | 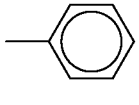 |
| B-12 | CONHCH₃ | CH₃ |
| B-13 | CONHCH₃ | 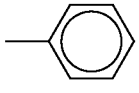 |
| B-14 | CONHC₄H₉⁽ⁿ⁾ | 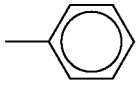 |
| B-15 | CONHPh | 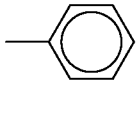 |
| B-16 | CONHCH₃ | 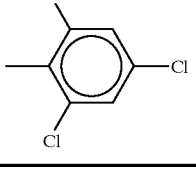 |
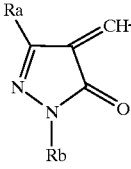
| No. | Ra | Rb | L³ |
|---|---|---|---|
| B-17 | CONHC₄H₉⁽ⁿ⁾ | CONHC₄H₉⁽ⁿ⁾ | CH |
| B-18 | 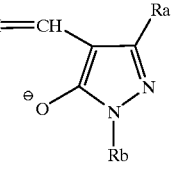 | H | CH |

-continued
| No. | Ra | Rb | L³ |
|---|---|---|---|
| B-19 | ![Ph] | CH₃ | CH |
| B-20 | ![Ph] | ![Ph] | CH |
| B-21 | ![Ph] | ![2,4,6-trichlorophenyl] | CH |
| B-22 | ![4-OCH₃-Ph] | ![Ph] | CH |
| B-23 | ![4-NHCOCH₃-Ph] | ![Ph] | CH |
| B-24 | ![4-CH₃-Ph] | ![Ph] | CH |
| B-25 | ![Ph] | ![2,4,6-trichlorophenyl] | C(CH₃) |
| B-26 | ![Ph] | CONHC₄H₉⁽ⁿ⁾ | CH |
| B-27 | ![Ph] | ![2-CH₃-Ph] | CH |
| B-28 | —COOEt | CH₂Ph | CH |
| B-29 | —SO₂CH₃ | ![Ph] | CH |
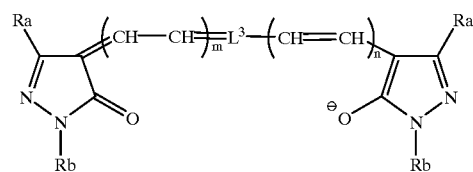
| No. | Ra | Rb | L³ | m | n |
|---|---|---|---|---|---|

| | | | | | |
|---|---|---|---|---|---|
| B-30 | CH₃SO₂NH— | 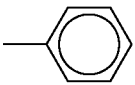 | CH | 1 | 1 |
| B-31 | HO | 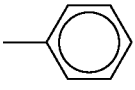 | C(CONH₂) | 1 | 1 |
| B-32 | CH₃ | 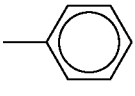 | C(Ph) | 1 | 1 |
| B-33 | CH₃ | 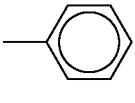 | C(CH₂Ph) | 1 | 1 |
| B-34 | CH₃ | 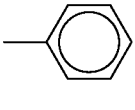 | 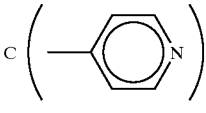 | 1 | 1 |
| B-35 | EtO— | 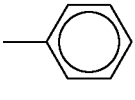 | CH | 1 | 1 |
| B-36 | —NHCOCH₃ | 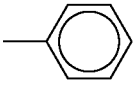 | CH | 1 | 1 |
| B-37 | —NHCOPh | 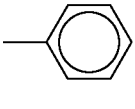 | CH | 1 | 1 |
| B-38 | —NHCOPh | —CONHC₄H₉$^{(n)}$ | CH | 1 | 1 |
| B-39 | —NHCOPh | —CONHPh | CH | 1 | 1 |
| B-40 | —COOEt | 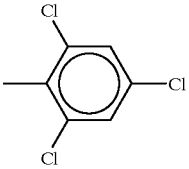 | CH | 1 | 0 |
| B-41 | —CN | 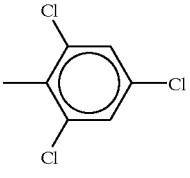 | CH | 1 | 0 |
| B-42 | —CF₃ | 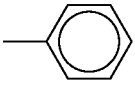 | CH | 1 | 0 |
| B-43 | —CONHC₄H₉$^{(n)}$ | 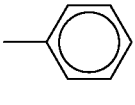 | CH | 1 | 0 |

-continued
| | | | | | |
|---|---|---|---|---|---|
| B-44 | —NHCOC$_4$H$_9^{(n)}$ |  | CH | 1 | 0 |
| No. | Ra | Rb | L$^3$ |
|---|---|---|---|
| B-45 | 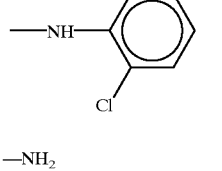 | 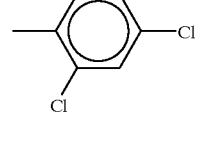 | CH |
| B-46 | —NH$_2$ | 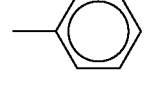 | CH |
| B-47 | —NHCONHC$_4$H$_9^{(n)}$ |  | CH |
| B-48 | —NHCOOC$_4$H$_9^{(n)}$ | 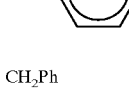 | CH |
| B-49 | 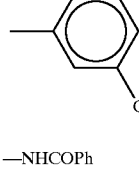 | CH$_2$Ph | CH |
| B-50 | —NHCOPh | 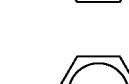 | C(Ph) |
| B-51 | 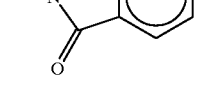 |  | CH |
| B-52 | 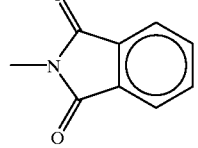 | 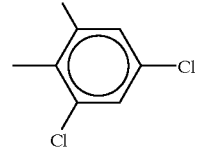 | CH |

-continued
| | | | |
|---|---|---|---|
| B-53 | —CN | 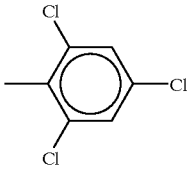 | CH |
| B-54 | —CF$_3$ | 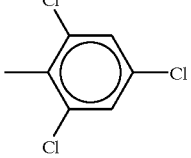 | CH |
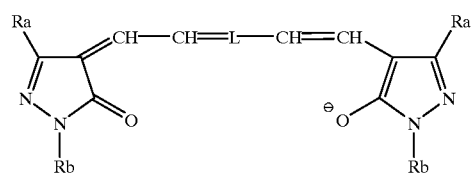
| No. | Ra | Rb | L |
|---|---|---|---|
| B-55 | —COOEt | 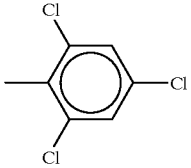 | C(CH$_3$) |
| B-56 | —CN | 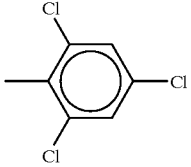 | C(CH$_3$) |
| B-57 | —CF$_3$ | 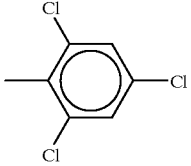 | C(CH$_3$) |
| B-58 | —COCH$_3$ | 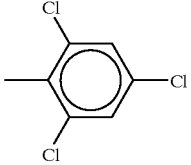 | C(CH$_3$) |
| B-59 | —COOEt | 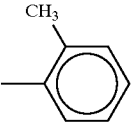 | C(CH$_3$) |

-continued

| No. | Ra | Rb | L |
|---|---|---|---|
| B-60 | —CN | 2,3-dimethylphenyl | C(CH₃) |
| B-61 | —COOEt | 2,3,5-trichlorophenyl | C(Br) |
| B-62 | —COOEt | 2,3,5-trichlorophenyl | C(Cl) |
| B-63 | —CN | 2,3,5-trichlorophenyl | C(Br) |

$$\underset{Rb}{\overset{Ra}{\underset{N}{\bigvee}}}\!\!=\!\!CH\!-\!L\!=\!CH\!-\!\underset{Rb}{\overset{Ra}{\underset{N}{\bigvee}}}\!O^{\ominus}$$

| No. | Ra | Rb | L |
|---|---|---|---|
| B-64 | —CN | phenyl | C(Br) |
| B-65 | —COOEt | phenyl | C(Cl) |
| B-66 | —COOEt | phenyl | CH |
| B-67 | —CONHCH₃ | phenyl | CH |
| B-68 | —NHCOCH₃ | phenyl | CH |
| B-69 | —CH₃ | phenyl | CH |

| | | | | |
|---|---|---|---|---|
| B-70 | —NH₂ | 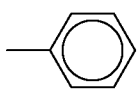 | | CH |
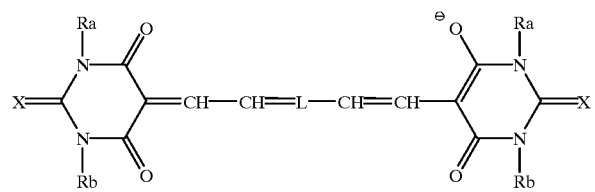
| No. | Ra | Rb | X | L |
|---|---|---|---|---|
| B-71 | H | H | O | CH |
| B-72 | H | CH₃ | O | CH |
| B-73 | H | nC₄H₉ | O | CH |
| B-74 | nC₄H₉ | nC₄H₉ | O | CH |
| B-75 | H | Ph | O | CH |
| B-76 | H | Ph | O | C(Ph) |
| B-77 | Ph | Ph | O | CH |
| B-78 | H | 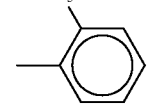 | O | CH |
| B-79 | H | 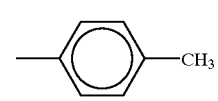 | O | CH |
| B-80 | H | H | S | CH |
| B-81 | H | C₂H₅ | S | CH |
| B-82 | C₂H₅ | C₂H₅ | S | CH |
| B-83 | H | nC₄H₉ | O | C(CH₂Ph) |
| B-84 | H | Ph | O | C(CH₃) |
| B-85 | H | Ph | S | CH |
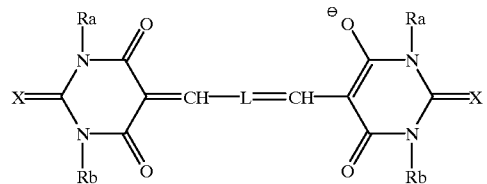
| No. | Ra | Rb | X | L |
|---|---|---|---|---|
| B-86 | H | nC₄H₉ | O | CH |
| B-87 | H | Ph | O | CH |
| B-88 | CH₃ | CH₃ | O | CH |
| B-89 | Ph | Ph | O | CH |
| B-90 | H | Ph | O | C(CH₃) |
| B-91 | H | 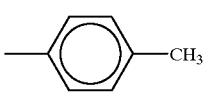 | O | C(CH₂Ph) |
| B-92 | H | nC₄H₉ | S | CH |
| B-93 | H | Ph | S | CH |
| B-94 | Ph | Ph | S | CH |
| B-95 | Et | Et | S | CH |
| B-96 | H | Ph | S | C(CH₃) |
B-97

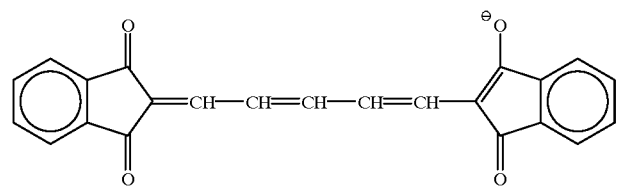
B-98
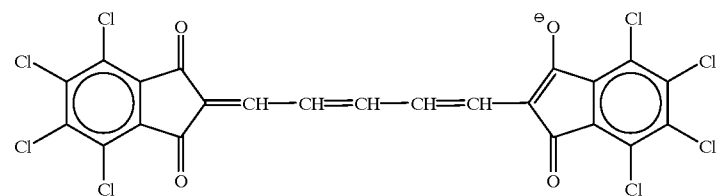
B-99
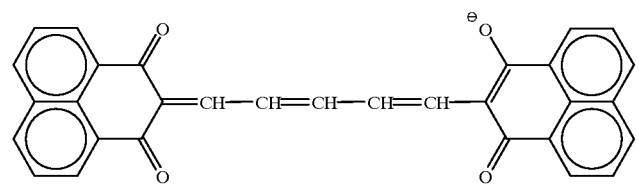
B-100
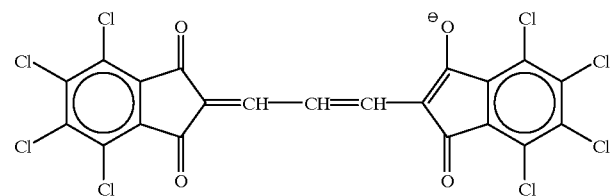
B-101
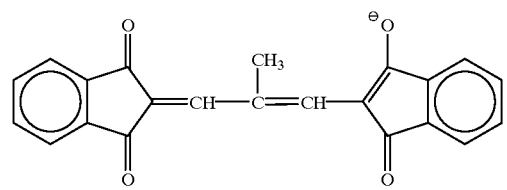
B-102
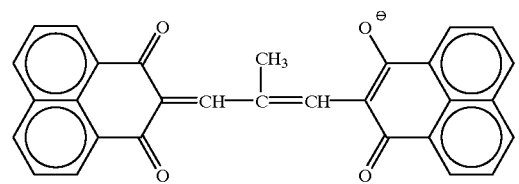
B-103

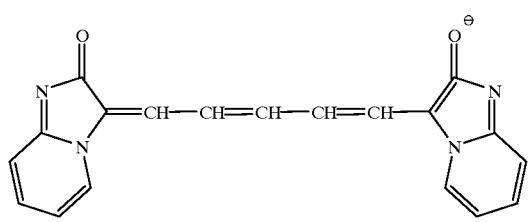
B-104
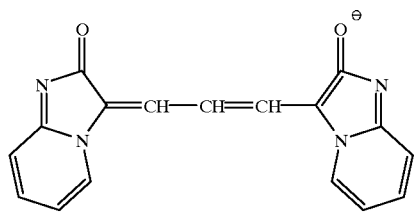
B-105
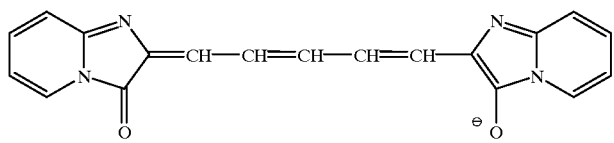
B-106
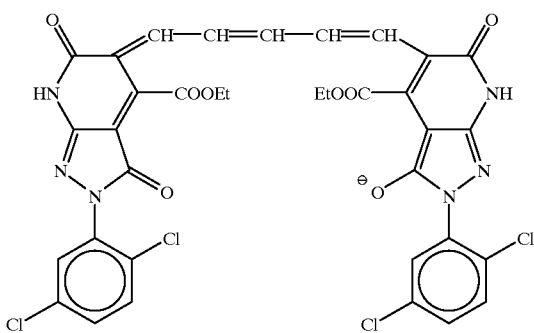
B-107
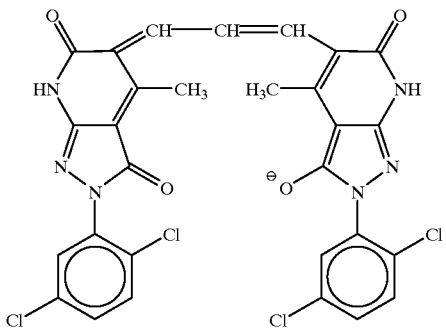
B-108

-continued
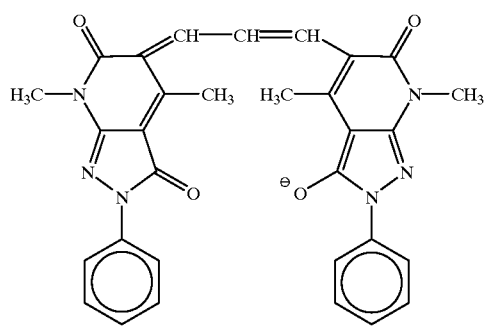
B-109
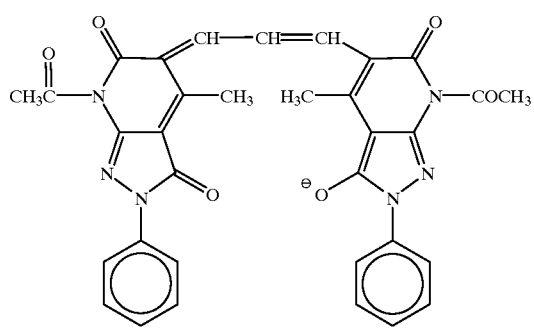
B-110
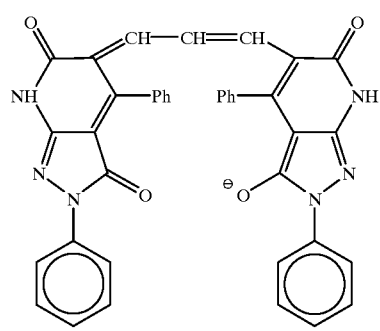
B-111
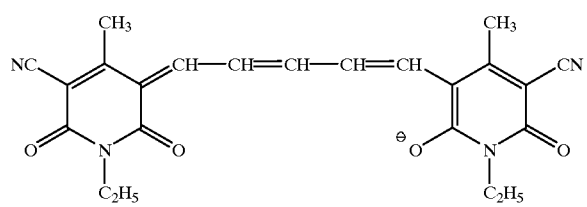
B-112
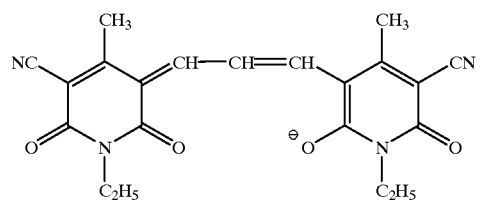
B-113

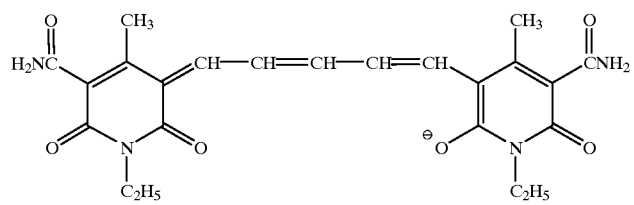
B-114
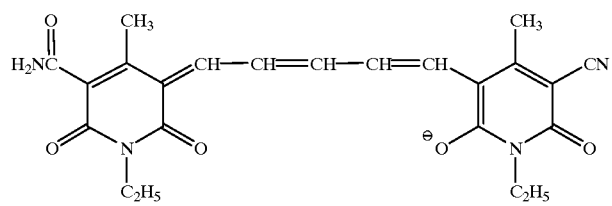
B-115
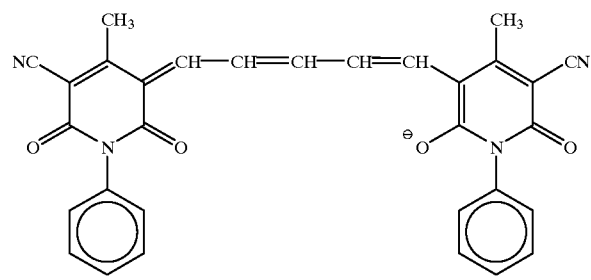
B-116
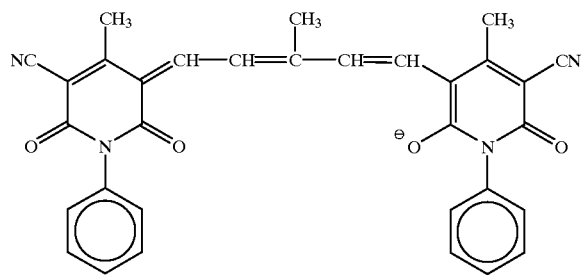
B-117
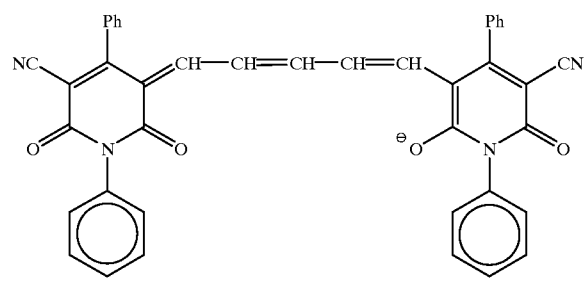
B-118

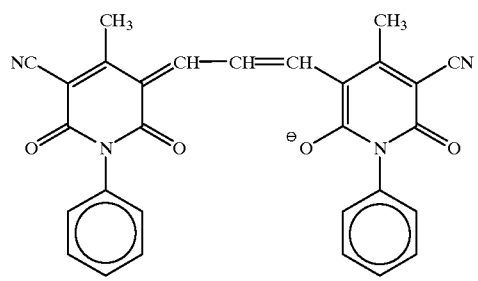
B-119
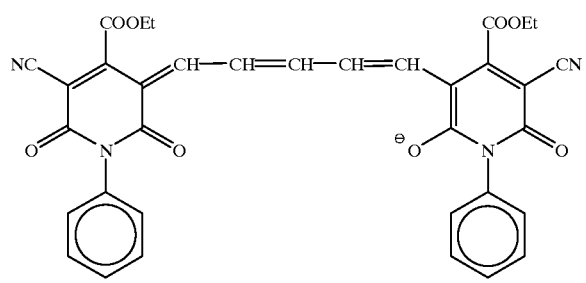
B-120
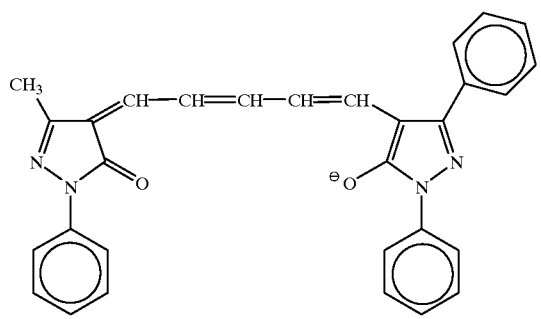
B-121
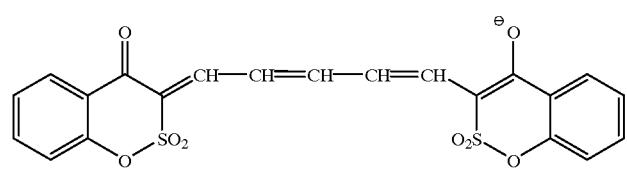
B-122
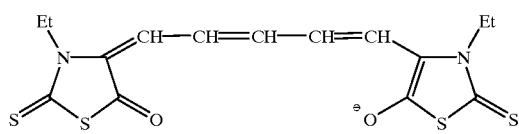
B-123
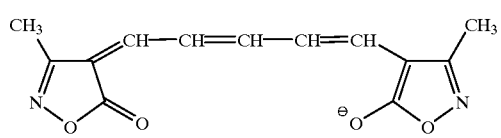
B-124

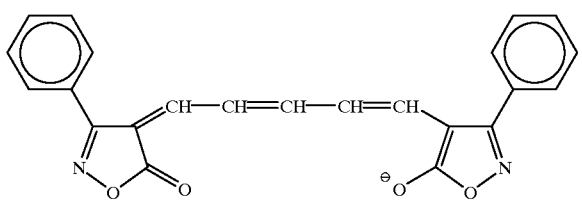
B-125
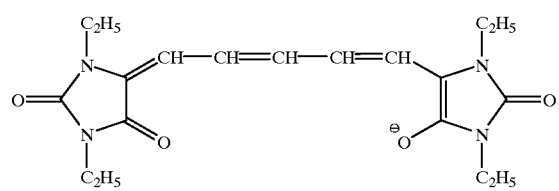
B-126
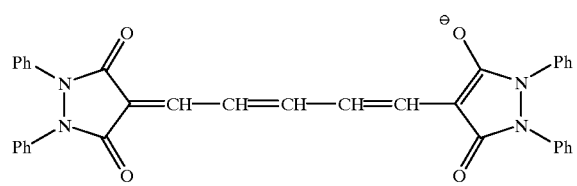
B-127
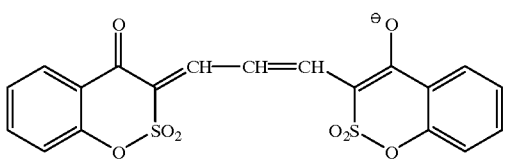
B-128
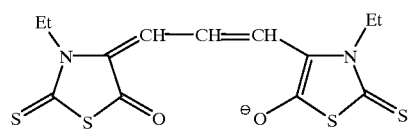
B-129
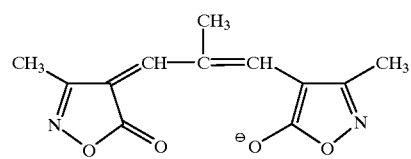
B-130
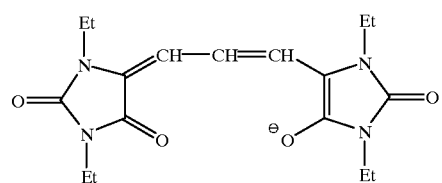
B-131

-continued
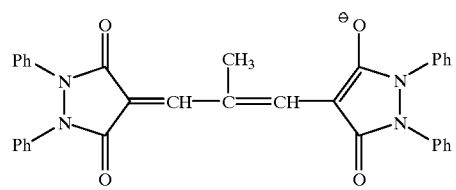
B-132
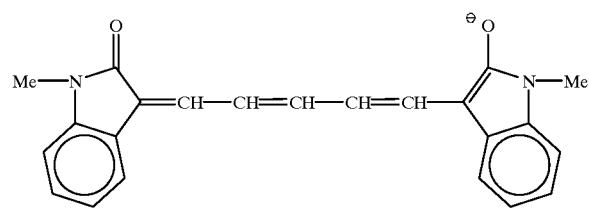
B-133
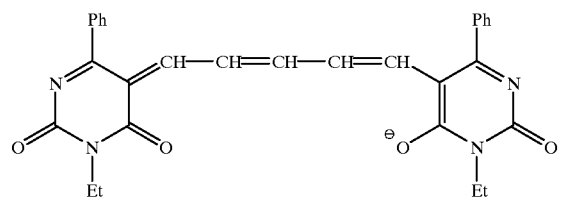
B-134
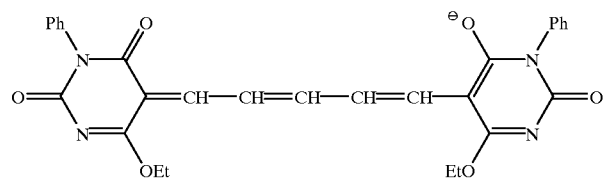
B-135
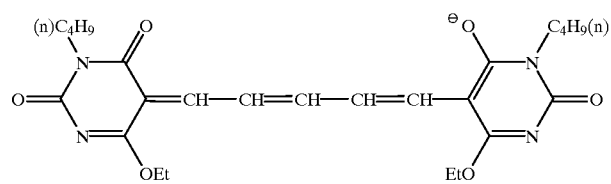
B-136
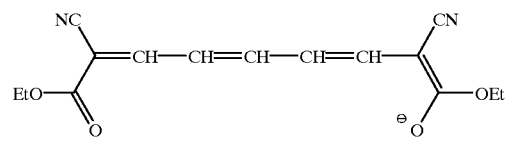
B-137
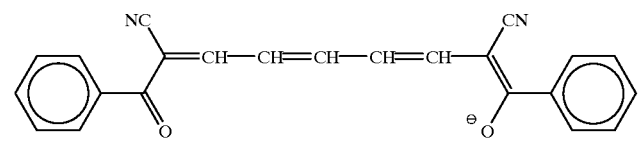
B-138

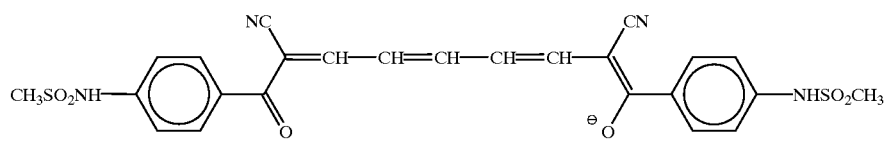
B-139
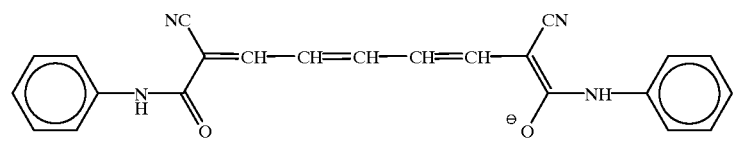
B-140
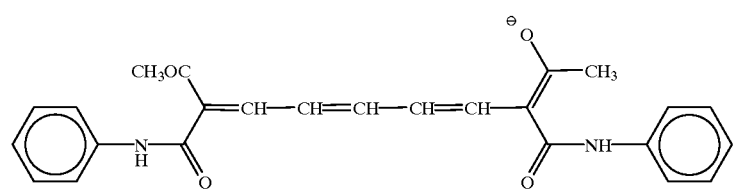
B-141
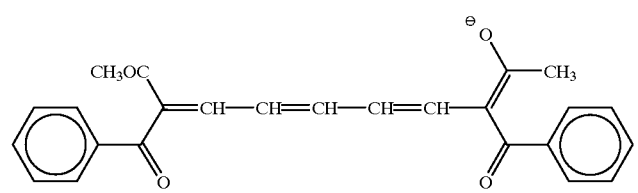
B-142
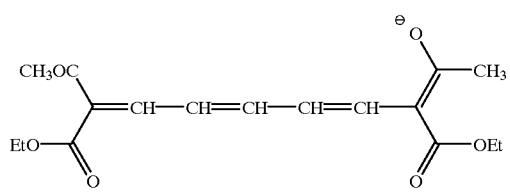
B-143
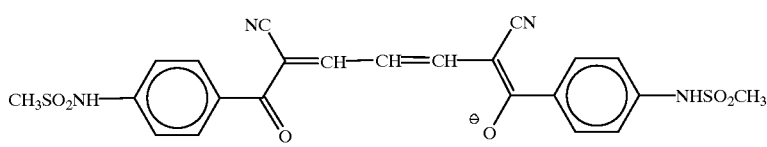
B-144
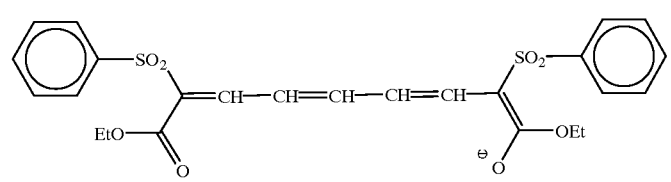
B-145

-continued
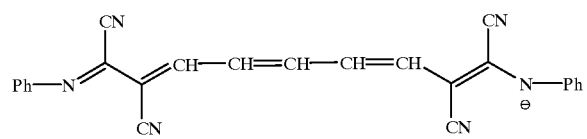
B-146
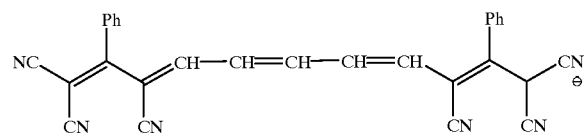
B-147
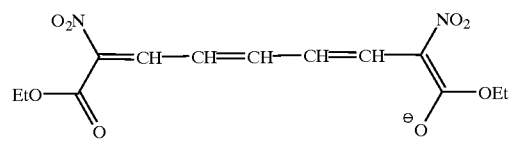
B-148
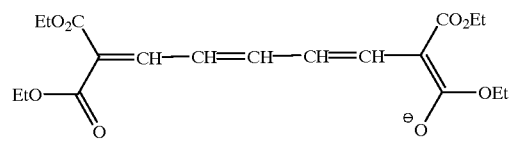
B-149
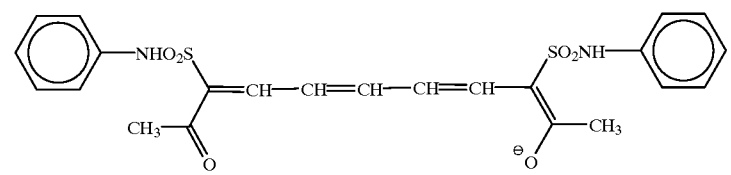
B-150
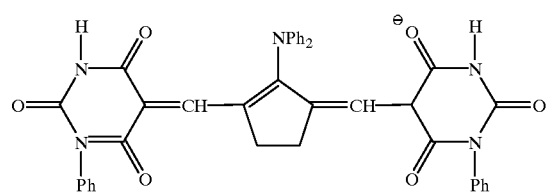
B-151
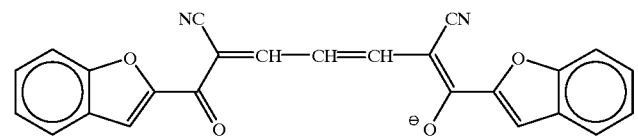
Concrete examples of preferred cation parts of the dye compounds having the formulas (V-1) and (V-2) are given below.
Na⁺
C-1
K⁺
Li⁺
H⁺
-continued
C-2
C-3
C-4

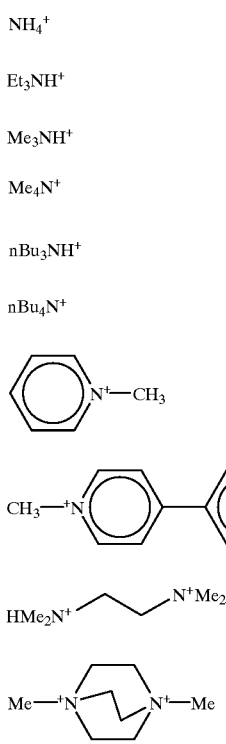

Non-restrictive concrete examples of the dye compounds of the formulas (V-i) and (V-2) are given below.

Compound D-1 (anion part: B-3, cation part: C-6):

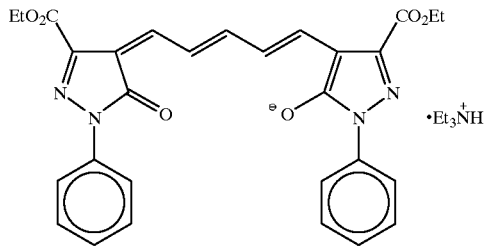

As is shown above, Compound D-1 can be indicated by the combination of the anion part (B-3) and the cation part (C-6). In the same manner, concrete examples of the compounds are set forth in the following Table. In the Table, each compound is indicated as a combination of the anion part and the cation part.

| Compound | anion | cation | Compound | anion | cation |
|---|---|---|---|---|---|
| D-1 | B-3 | C-6 | D-11 | B-6 | C-10 |
| D-2 | B-3 | C-5 | D-12 | B-6 | C-11 |
| D-3 | B-3 | C-8 | D-13 | B-9 | C-5 |
| D-4 | B-3 | C-9 | D-14 | B-9 | C-6 |
| D-5 | B-3 | C-10 | D-15 | B-9 | C-8 |
| D-6 | B-3 | C-11 | D-16 | B-9 | C-9 |
| D-7 | B-6 | C-5 | D-17 | B-9 | C-10 |
| D-8 | B-6 | C-6 | D-18 | B-9 | C-11 |
| D-9 | B-6 | C-8 | D-19 | B-9 | C-51 |
| D-10 | B-6 | C-9 | D-20 | B-11 | C-6 |
| D-21 | B-20 | C-5 | D-31 | B-27 | C-6 |
| D-22 | B-20 | C-6 | D-32 | B-27 | C-10 |
| D-23 | B-20 | C-8 | D-33 | B-40 | C-5 |
| D-24 | B-20 | C-9 | D-34 | B-40 | C-6 |
| D-25 | B-20 | C-10 | D-35 | B-40 | C-8 |
| D-26 | B-20 | C-11 | D-36 | B-40 | C-9 |
| D-27 | B-21 | C-6 | D-37 | B-40 | C-10 |
| D-28 | B-21 | C-6 | D-38 | B-40 | C-11 |
| D-29 | B-25 | C-6 | D-39 | B-41 | C-6 |
| D-30 | B-27 | C-5 | D-40 | B-42 | C-6 |
| D-41 | B-53 | C-6 | D-48 | B-61 | C-51 |
| D-42 | B-53 | C-8 | D-49 | B-62 | C-6 |
| D-43 | B-53 | C-11 | D-50 | B-62 | C-8 |
| D-44 | B-55 | C-6 | D-51 | B-62 | C-11 |
| D-45 | B-61 | C-6 | D-52 | B-62 | C-6 |
| D-46 | B-61 | C-10 | D-53 | B-64 | C-10 |
| D-47 | B-61 | C-11 | D-54 | B-3 | C-2 |

Each of the compounds of the formula (IV), (V-1) or (V-2) of the invention can be employed singly or in combination with two or more compounds. Further, the compound of the invention can be also employed in combination with other known dye compounds. Examples of such known dye compounds include known cyanine dyes, phthalocyanine dyes, pyrylium dyes, thiopyrylium dyes, azulenium dyes, squalium dyes, metal complex dyes such as Ni complex and Cr complex, naphthoquinone dye, triphenylmethane dyes, triarylmethane dyes, and aminium/diimmonium dyes.

The recording layer can be formed on the substrate (support) by coating a solution of a mixture of the above quaternary ammonium salt, the dye, and if desired, binder in an organic solvent and drying the coated layer. Examples of the organic solvents include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine-containing solvents such as 2,2,3,3-tetrafluoropropanol; and glycol ethers such as ethylenegylcol monomethyl ether, ethyleneglycol monoethyl ether, and propyleneglycol monomethyl ether. These solvents can be employed in combination, in consideration of the solubility of the used compound in the solvent.

The coating solution can further contain auxiliary additives such as an oxidation inhibitor, a UV absorber, a plasticizer, and a lubricant.

Examples of the binders include natural-origin polymers such as gelatin, cellulose derivatives, dextran, rosin, and rubber; hydrocarbon polymer resins such as polyethylene, polypropylene, polystyrene and polyisobutyrene; vinyl polymers such as polyvinyl chloride, polyvinylidene chloride, and vinyl chloride-vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The binder is optionally employable so that the ratio of the dye to the binder can be in the range of 0.01 to 99 weight %, preferably 1.0 to 95 weight %.

The coating solution generally has a concentration of 0.01 to 10 weight % (solid content), preferably 0.1 to 5 weight %.

The coating can be performed by the known methods such as spray coat, spin coat, dip coat, roller coat, blade coat, doctor roller coat and screen print.

The recording layer can be a single layer or can comprise plural layers. The thickness of the recording layer generally is in the range of 20 to 500 nm, preferably 50 to 300 nm. The recording layer can be provided on both of the surfaces of the substrate.

On the recording layer, the light-reflecting layer is placed so as to enhance the light-reflection in the course of reproduction of information.

The light-reflecting material to be used for the formation of the light-reflecting layer should show a high reflection to the laser light. Examples of the light-reflecting materials include metals and sub-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film is also employable. Preferred light-reflecting material is Cr, Ni, Pt, Cu, Ag, Au and Al. These materials can be employed singly or in the form of alloy.

The light-reflecting layer can be formed on the recording layer by vacuum deposition, sputtering or ion-plating. The thickness of the light-reflecting layer generally is 10 to 200 nm, preferably 50 to 200 nm.

On the light-reflecting layer can be placed a protective layer. The protective layer can be placed on the substrate on the side not having the recording layer.

The protective layer can be formed of inorganic materials such as SiO, $SiO_2$, $MgF_2$, $SnO_2$, $Si_3N_4$; or organic materials such as thermoplastic resins, thermo-setting resins, and UV curable resins.

The protective layer can be formed on the light-reflecting layer or the substrate by laminating a film of plastic material using an adhesive. The inorganic material can be placed on the light-reflecting layer or the substrate by vacuum deposition or sputtering. The organic polymer material can be coated in the form of a solution containing the polymer material and dried to give the protective layer. The UV curable resin is dissolved in a solvent and coated on the light-reflecting layer or the substrate, and cured by applying ultra-violet rays to the coated layer. The coating layer can contain various additives such as an anti-static agent, an oxidation inhibitor, and a ultra-violet absorber. The protective layer generally has a thickness of 0.1 to 100 μm.

The information recording medium of the invention can comprise one substrate having one or two recording layers or two substrates each of which has one recording layer and combined to give a known air sandwich structure.

The information recording medium of the invention shows a high light-reflection and an improved light-resistance as well as good recording and reproducing characteristics. Particularly, the information recording medium of the invention shows an extremely high light-reflection of as high as 80%, and hence the reproduction of the recorded information can be accomplished by means of a commercially available CD player.

The information recording can be made in the following manner using the recording medium of the invention.

The information recording medium is rotated at a predetermined constant line rate (1.2 to 14 m/sec., in the case of CD format) or a predetermined constant angle rate. On the rotated medium, a recording light source such as a semiconductor laser beam is applied through the transparent substrate. By the application of the laser beam, pits are formed in the recording layer. The pit is assumed to be produced by local vacancy of the recording layer, deformation of the recording layer and/or the substrate, change of the physical or chemical characteristics of the recording layer. The light source preferably is a semiconductor layer having an oscillation frequency in the range of 500 to 850 nm. The preferred beam wave-length is in the range of 500 to 800 nm.

In the case of the CR-R type recording medium, the laser beam preferably has a wavelength of 770 to 790 nm, while in the case of DVD-R type recording medium, the laser beam preferably has a wavelength of 630 to 680 nm.

The reproduction of the recorded information can be accomplished by applying a semiconductor laser beam on the medium rotated at the same rate as that employed in the recording procedure. The light-reflection is then detected on the substrate side.

The present invention is further described by the following non-restrictive working examples.

EXAMPLE 1

3 g of the above-illustrated cyanine dye compound (IV-16) and 0.3 g of the quaternary ammonium salt shown in the hereinafter-mentioned Table were dissolved in 100 mL of 2,2,3,3-tetrafluoropropanol to give a coating solution.

The coating solution was coated by spin coat on the surface of a polycarbonate substrate (diameter: 120 mm, thickness: 1.2 mm) to give a coated layer of approx. 200 nm thick. The substrate had a spirally formed pregroove (track pitch: 1.7 μm, groove width: 0.4 μm, depth: 0.16 μm) which was produced in the injection molding of the substrate.

On the coated dye layer was placed a light-reflecting layer made of gold (thickness: approximately 100 nm) by sputtering, and then a UV curable photopolymer (UV curable agent: SD-220, available from Dainippon Ink & Chemicals, Inc.) was coated to give a coated layer of 7 μm thick. The coated layer was irradiated with ultra-violet rays to be cured to form a protective layer. Thus, an information recording disc of the invention was prepared.

EXAMPLE 2

The procedure of Example 1 was repeated except that the above cyanine dye compound (IV-16) was replaced with the same amount of the oxonol dye compound (D-1), to prepare information recording disc of the invention.

Comparison Example 1

The procedure of Example 1 was repeated except that the quaternary ammonium salt was not employed, to prepare an information recording disc for comparison.

Comparison Example 2

The procedure of Example 2 was repeated except that the quaternary ammonium salt was not employed, to prepare an information recording disc for comparison.

Comparison Example 3

The procedure of Example 1 was repeated except that the quaternary ammonium salt was replaced with the same amount of the nitroso compound (a) shown below, to prepare information recording disc of the invention.

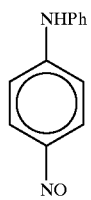

Comparison Example 4

The procedure of Example 2 was repeated except that the quaternary ammonium salt was replaced with the same amount of the nitroso compound (a) shown above, to prepare information recording disc of the invention.

Evaluation of Information Recording Medium (1) Modulation

On the recording medium rotating at 1.4 m/sec., EFM signals of 3T and 11T were recorded by means of a laser beam of wavelength 780 nm. The laser power was varied between 4 mW and 9 mW. The recorded signals were reproduced by the use of the laser beam having a laser power of 0.5 mW. The modulation factors of the 3T and 11T signals were measured under the optimum power.

(2) Light-reflection

The light-reflections of the groove (non-recorded area) were also measured under the optimum power when the signals were reproduced in the above (1).

(3) Light-resistance

The recording medium was exposed to light of 140,000 lux from Xe lamp for 18 hours or for 36 hours. Thereafter, the modulation factors and the light-reflections were measured in the same manner described above. At the same time, the color of the recording medium was observed by sight to classify the degree of fading into the following ranks: AA: not faded, BB: slightly faded, and CC: completely faded.

The results are set forth in the following Tables.

| quaternary ammonium | Recording and Reproducing Characteristics ||||
|---|---|---|---|---|
| | 3T Mod. | 11T Mod. | Reflection | Fading |
| I-1 (Example 1) |||||
| (none) | 0.497 | 0.807 | 69% | — |
| (18 hrs) | 0.502 | 0.813 | 69% | AA |
| (36 hrs) | 0.425 | 0.700 | 71% | AA |
| I-6 (Example 1) |||||
| (none) | 0.469 | 0.791 | 69% | — |
| (18 hrs) | 0.389 | 0.702 | 73% | AA |
| (36 hrs) | 0.376 | 0.681 | 77% | AA |
| I-72 (Example 1) |||||
| (none) | 0.472 | 0.790 | 68% | — |
| (18 hrs) | 0.367 | 0.678 | 75% | AA |
| (36 hrs) | 0.330 | 0.595 | 80% | AA |
| I-74 (Example 1) |||||
| (none) | 0.468 | 0.789 | 68% | — |
| (18 hrs) | 0.403 | 0.702 | 71% | AA |
| (36 hrs) | 0.373 | 0.680 | 76% | AA |
| I-76 (Example 1) |||||
| (none) | 0.477 | 0.796 | 69% | — |
| (18 hrs) | 0.326 | 0.671 | 78% | AA |
| (36 hrs) | 0.301 | 0.607 | 85% | BB |
| I-83 (Example 1) |||||
| (none) | 0.470 | 0.791 | 67% | — |
| (18 hrs) | 0.219 | 0.612 | 83% | AA |
| (36 hrs) | 0.110 | 0.306 | 90% | BB |
| not added (Comparison Example 1) |||||
| (none) | 0.594 | 0.848 | 70% | — |
| (18 hrs) | — | — | — | — |
| (36 hrs) | — | — | — | — |
| Compound (a) (Comparison Example 3) |||||
| (none) | 0.466 | 0.788 | 68% | — |
| (18 hrs) | 0.108 | 0.289 | 89% | BB |
| (36 hrs) | — | — | — | — |
| I-1 (Example 2) |||||
| (none) | 0.432 | 0.753 | 67% | — |
| (18 hrs) | 0.417 | 0.731 | 67% | AA |
| (36 hrs) | 0.404 | 0.680 | 68% | AA |

-continued

| quaternary ammonium | Recording and Reproducing Characteristics ||||
|---|---|---|---|---|
| | 3T Mod. | 11T Mod. | Reflection | Fading |
| I-6 (Example 2) |||||
| (none) | 0.434 | 0.755 | 68% | — |
| (18 hrs) | 0.418 | 0.733 | 68% | AA |
| (36 hrs) | 0.408 | 0.686 | 69% | AA |
| I-72 (Example 2) |||||
| (none) | 0.547 | 0.798 | 67% | — |
| (18 hrs) | 0.544 | 0.797 | 67% | AA |
| (36 hrs) | 0.542 | 0.794 | 67% | AA |
| I-74 (Example 2) |||||
| (none) | 0.552 | 0.802 | 66% | — |
| (18 hrs) | 0.550 | 0.800 | 66% | AA |
| (36 hrs) | 0.547 | 0.796 | 67% | AA |
| I-76 (Example 2) |||||
| (none) | 0.498 | 0.778 | 69% | — |
| (18 hrs) | 0.483 | 0.720 | 71% | AA |
| (36 hrs) | 0.264 | 0.533 | 87% | BB |
| I-83 (Example 2) |||||
| (none) | 0.502 | 0.781 | 66% | — |
| (18 hrs) | 0.491 | 0.748 | 68% | AA |
| (36 hrs) | 0.285 | 0.542 | 85% | BB |
| not added (Comparison Example 2) |||||
| (none) | 0.563 | 0.828 | 69% | — |
| (18 hrs) | — | — | — | — |
| (36 hrs) | — | — | — | — |
| Compound (a) (Comparison Example 4) |||||
| (none) | 0.476 | 0.798 | 67% | — |
| (18 hrs) | 0.109 | 0.218 | 85% | CC |
| (36 hrs) | — | — | — | — |

Remarks: (none) means the data before exposure to Xe lamp, and (18 hrs) and (36 hrs) mean the data after 18 hours exposure and 36 hours exposure, respectively. — means that the tracking failed.

As is evident from the data set forth in Tables 11 and 12, the information recording disc of the invention exhibits remarkably improved light-resistance, as well as excellent modulation factor and high light-reflection.

EXAMPLE 3

The same amount of $1\times10^{-5}$ M methanol solution of the above cyanine dye compound (IV-16) and $1\times10^{-6}$ M methanol solution of the quaternary ammonium salt shown in the hereinafter-mentioned Table were mixed to prepare a sample solution. The sample solution was exposed to light of 140,000 lux from Xe lamp for 3 hours, and then an amount of the remaining cyanine dye was measured by means of UV-visible spectrophotometer. The results are set forth in the same Table.

EXAMPLE 4

The same amount of $2\times10^{-5}$ M methanol solution of the above oxonol dye compound (D-1) and $2\times10^{-6}$ M methanol solution of the quaternary ammonium salt shown in the Table were mixed to prepare a sample solution. The sample solution was exposed to light of 140,000 lux from Xe lamp for 3 hours, and then an amount of the remaining oxonol dye was measured by means of UV-visible spectrophotometer. The results are set forth in the same Table.

Comparison Example 5

$5\times10^{-5}$ M methanol solution of the above cyanine dye compound (IV-16) was exposed to light of 140,000 lux from Xe lamp for 3 hours, and then an amount of the remaining cyanine dye was measured by means of UV-visible spectrophotometer. The results are set forth in the following Table.

Comparison Example 6

$1\times10^{-5}$ M methanol solution of the above oxonol dye compound (D-1) was exposed to light of 140,000 lux from Xe lamp for 3 hours, and then an amount of the remaining oxonol dye was measured by means of UV-visible spectrophotometer. The results are set forth in the following Table.

| ammonium salt | solvent | remaining cyanine dye |
|---|---|---|
| I-1 (Example 3) | methanol | 63% |
| I-6 (Example 3) | methanol | 62% |
| I-72 (Example 3) | methanol | 65% |
| I-74 (Example 3) | methanol | 65% |
| I-76 (Example 3) | methanol | 60% |
| I-83 (Example 3) | methanol | 61% |
| none (Com. Ex. 5) | methanol | 52% |

| ammonium salt | solvent | remaining oxonol dye |
|---|---|---|
| I-1 (Example 4) | methanol | 40% |
| I-6 (Example 4) | methanol | 38% |
| I-72 (Example 4) | methanol | 44% |
| I-74 (Example 4) | methanol | 44% |
| I-76 (Example 4) | methanol | 35% |
| I-83 (Example 4) | methanol | 33% |
| none (Com. Ex. 6) | methanol | 21% |

As is evident from the results set forth in the above Tables, the light-resistance of the organic dyes can be enhanced by mixing the quaternary ammonium salt of the invention with the organic dyes.

What is claimed is:

1. An information recording medium comprising a support and a recording layer provided thereon, wherein said recording layer comprises an organic dye and a quaternary ammonium salt having the following formula (I):

$$M^{n+} \cdot n/m \ X^{m-} \qquad (I)$$

in which $M^{n+}$ represents a divalent cation of 2,2'-bipyridyl, 4,4'-bipyridyl or phenanthroline which has on each of its nitrogen atoms a substituent group selected from the group consisting of alkyl, alkenyl, alkynyl and aryl, $X^{m-}$ represents an anion, n represents an integer of not less than 2, and m represents an integer of not less than 1.

2. The information recording medium of claim 1, wherein the anion represented by $X^{m-}$ is selected from the group consisting of $Cl^-$, $Br^-$, $I^-$, p-toluenesulfonate anion, $ClO_4{-}$, $BF_4{-}$, and $SbF_6{-}$.

3. The information recording medium of claim 1, wherein the quaternary ammonium ion represented by $M^{n+}$ has the following formula (II) or (III):

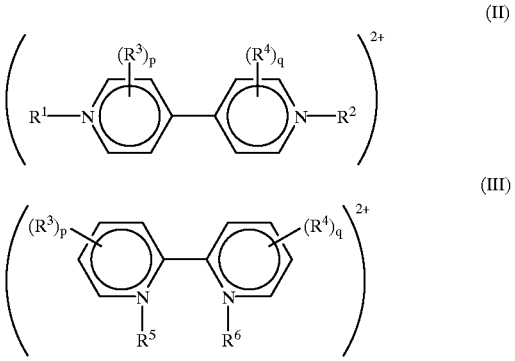

in which each of $R^1$ and $R^2$ independently represents an alkyl group, an alkenyl group, an alkynyl group or an aryl group; each of $R^3$ and $R^4$ independently represents a substituent group or substituent atom; each of $R^5$ and $R^6$ independently represents an alkyl group, an alkenyl group, an alkynyl group or an aryl group; or each set of $R^1$ and $R^2$, $R^3$ and $R^4$, or $R^5$ and $R^6$ can be combined to form a ring; each of p and q independently represents an integer of 0 to 4, under the conditions that there can be different $R^3$ in the case that p is 2 or more, and there can be different $R^4$ in the case that q is 2 or more.

4. The information recording medium of claim 1, wherein the organic dye is a cyanine dye or an oxonol dye.

5. The information recording medium of claim 1, wherein a light-reflecting layer is provided on the recording layer.

6. A method for preventing an organic dye from fading which comprises mixing the organic dye with a quaternary ammonium salt having the following formula (I):

$$M^{n+} \cdot n/m \ X^{m-} \qquad (I)$$

in which $M^{n+}$ represents a divalent cation of 2,2'-bipyridyl, 4,4'-bipyridyl or phenanthroline which has on each of its nitrogen atoms a substituent group selected from the group consisting of alkyl, alkenyl, alkynyl and aryl, $X^{m-}$ represents an anion, n represents an integer of not less than 2, and m represents an integer of not less than 1.

7. The method of claim 6, wherein the anion represented by $X^{m-}$ is selected from the group consisting of $Cl^-$, $Br^-$, $I^-$, p-toluenesulfonate anion, $ClO_4{-}$, $BF_4{-}$, and $SbF_6{-}$.

* * * * *